(12) United States Patent
Piao

(10) Patent No.: US 12,437,503 B2
(45) Date of Patent: Oct. 7, 2025

(54) PERSON RETRIEVAL SYSTEM

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 439 days.

(21) Appl. No.: 17/920,145

(22) PCT Filed: Apr. 27, 2020

(86) PCT No.: PCT/JP2020/018001
§ 371 (c)(1),
(2) Date: Oct. 20, 2022

(87) PCT Pub. No.: WO2021/220354
PCT Pub. Date: Nov. 4, 2021

(65) Prior Publication Data
US 2023/0206593 A1    Jun. 29, 2023

(51) Int. Cl.
*G06V 10/75* (2022.01)
*G06F 16/532* (2019.01)
(Continued)

(52) U.S. Cl.
CPC .......... *G06V 10/751* (2022.01); *G06F 16/532* (2019.01); *G06V 10/7715* (2022.01); *G06V 20/52* (2022.01); *G06V 40/10* (2022.01)

(58) Field of Classification Search
CPC .. G06V 10/751; G06V 10/7751; G06V 10/82; G06V 20/52; G06V 40/10; G06V 40/103; G06F 16/532
See application file for complete search history.

(56) References Cited

U.S. PATENT DOCUMENTS 10,868,984 B1 * 12/2020 Charlton .............. G06F 21/32
2004/0073543 A1 * 4/2004 Kim .................. G06V 30/2504
707/E17.02
(Continued)

FOREIGN PATENT DOCUMENTS

JP    2013-140475 A    7/2013
JP    2015-179431 A    10/2015
(Continued)

OTHER PUBLICATIONS

International Search Report for PCT Application No. PCT/JP2020/018001, mailed on Aug. 4, 2020.

*Primary Examiner* — John B Strege
(74) *Attorney, Agent, or Firm* — Sughrue Mion, PLLC

(57) ABSTRACT

A person retrieval system includes a person/carrying object image extraction unit that extracts, from an input image, a person/carrying object image that is an image of a person to be retrieved including an image of a carrying object, a carrying object image extraction unit that extracts an image of the carrying object from the person/carrying object image, a person image calculation unit that calculates a person image that is the person/carrying object image after processing is made on the carrying object part in the person/carrying object image so as to prevent a significant feature amount from being extracted, a person feature amount extraction unit that extracts a person feature amount from the person image, and a determination unit that compares the person feature amount with a registered person feature amount of a registered person, and determines whether the person to be retrieved is the same as the registered person.

12 Claims, 20 Drawing Sheets

(51) Int. Cl.
*G06V 10/77* (2022.01)
*G06V 20/52* (2022.01)
*G06V 40/10* (2022.01)

(56) References Cited

U.S. PATENT DOCUMENTS

| | | | | |
|---|---|---|---|---|
| 2009/0060294 | A1* | 3/2009 | Matsubara | G06F 16/532 |
| | | | | 382/118 |
| 2013/0250050 | A1* | 9/2013 | Kanaujia | H04N 13/106 |
| | | | | 348/42 |
| 2020/0364479 | A1* | 11/2020 | Tseng | G06V 10/761 |
| 2021/0089824 | A1* | 3/2021 | Ge | G06F 18/214 |

FOREIGN PATENT DOCUMENTS

| | | |
|---|---|---|
| JP | 2020-013290 A | 1/2020 |
| WO | 2011/046128 A1 | 4/2011 |

* cited by examiner

PERSON RETRIEVAL SYSTEM

This application is a National Stage Entry of PCT/JP2020/018001 filed on Apr. 27, 2020, the contents of all of which are incorporated herein by reference, in their entirety.

TECHNICAL FIELD

The present invention relates to a person retrieval system, a person retrieval method, and a storage medium.

BACKGROUND ART

Devices and methods for looking for a specific person from videos of a monitoring camera have been proposed and put into practice.

For example, Patent Literature 1 describes art (hereinafter, related art) for performing association of specific persons from videos of a plurality of cameras and retrieval of a person designated as a person to beware of, by comparing feature amounts of each part such as heads, faces, clothes, bags, backpacks, rucksacks, caps, or watches of a plurality of persons, and when the total sum of the similarity of each part is a certain threshold or larger, and determining they are the same person.

Patent Literature 1: JP 2020-13290 A

SUMMARY

According to the related art described above, when a person to be retrieved has a carrying object such as a backpack, the carrying object is detected as one part. As a result, there is a possibility of failure in retrieval of the same person due to an influence of the carrying object. That is, there is a possibility that an image of the same person not carrying an object at all, or another image of the same person carrying another object that is different in color or shape is excluded from the retrieval results. Moreover, there is also a possibility that an image of another person carrying a similar object is retrieved as an image of the same person.

An object of the present invention is to provide a person retrieval system that solves the problem described above, that is, a problem that there is a possibility of a failure in retrieving the same person due to an influence of a carrying object.

A person retrieval system, according to one aspect of the present invention, is configured to include a query person/carrying object image extraction unit that extracts, from an input image, a query person/carrying object image that is an image of a person to be retrieved including an image of a carrying object;

a query carrying object image extraction unit that extracts an image of the carrying object from the query person/carrying object image;

a query person image calculation unit that calculates a query person image that is the query person/carrying object image after processing is made on the image part of the carrying object in the query person/carrying object image so as to prevent a significant feature amount from being extracted;

a query person feature amount extraction unit that extracts a query person feature amount from the query person image; and a determination unit that compares the query person feature amount with a registered person feature amount of a registered person previously registered in a database, and determines whether or not the person to be retrieved is the same as the registered person.

Further, a person retrieval method, according to another aspect of the present invention, is configured to include extracting, from an input image, a query person/carrying object image that is an image of a person to be retrieved including an image of a carrying object;

extracting an image of the carrying object from the query person/carrying object image;

calculating a query person image that is the query person/carrying object image after processing is made on the image part of the carrying object in the query person/carrying object image so as to prevent a significant feature amount from being extracted;

extracting a query person feature amount from the query person image; and comparing the query person feature amount with a registered person feature amount of a registered person previously registered in a database, and determining whether or not the person to be retrieved is the same as the registered person.

Further, a computer-readable medium, according to another aspect of the present invention, is configured to store thereon a program for causing a computer to execute processing to:

extract, from an input image, a query person/carrying object image that is an image of a person to be retrieved including an image of a carrying object;

extract an image of the carrying object from the query person/carrying object image;

calculate a query person image that is the query person/carrying object image after processing is made on the image part of the carrying object in the query person/carrying object image so as to prevent a significant feature amount from being extracted;

extract a query person feature amount from the query person image; and compare the query person feature amount with a registered person feature amount of a registered person previously registered in a database, and determine whether or not the person to be retrieved is the same as the registered person.

With the configurations described above, the present invention can prevent a failure in retrieval of the same person due to an influence of a carrying object.

EXEMPLARY EMBODIMENTS

Next, exemplary embodiments of the present invention will be described with reference to the drawings.

First Exemplary Embodiment

Figure 1:
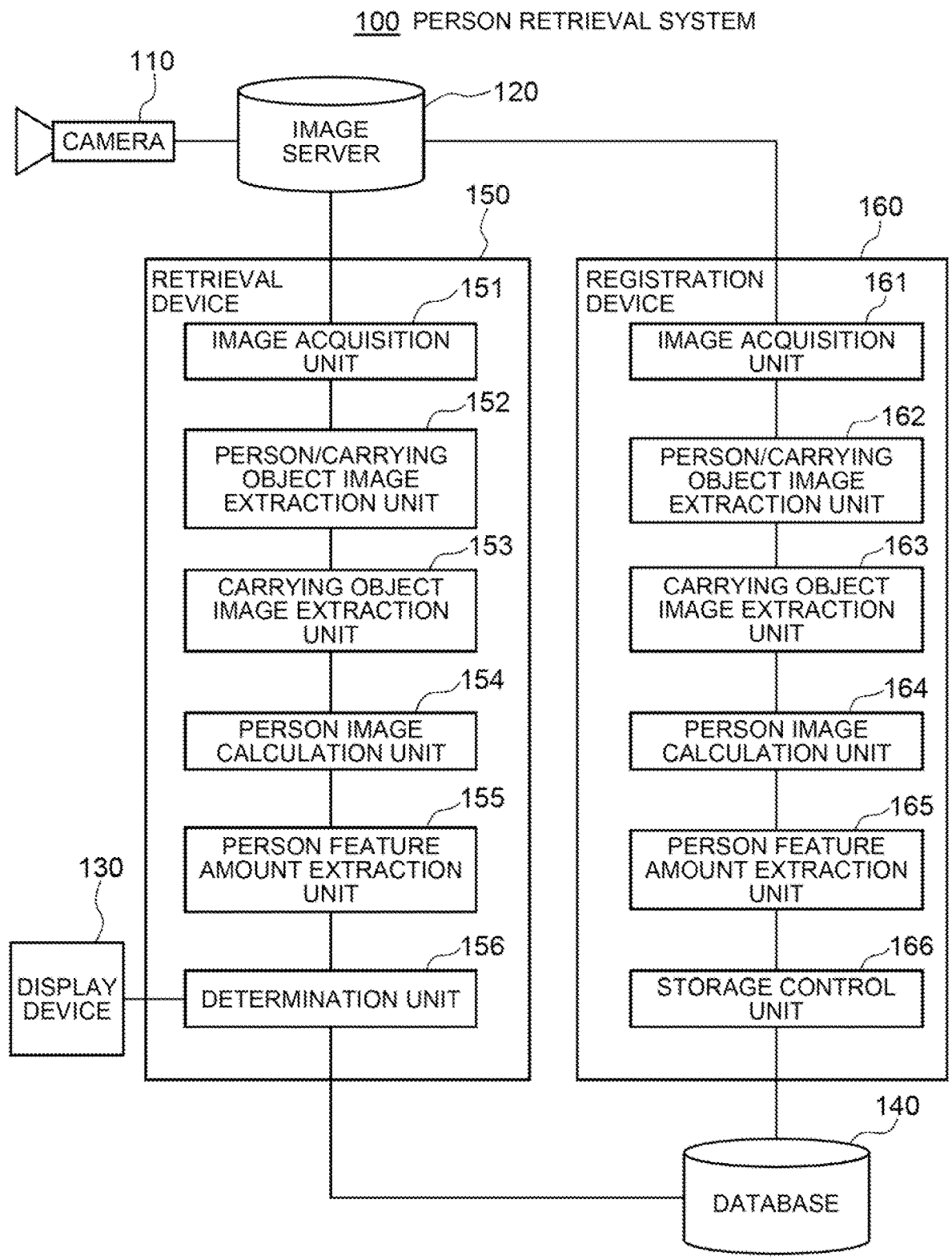
FIG. 1 is a block diagram of a person retrieval system according to a first exemplary embodiment of the present invention.

FIG. 1 is a block diagram of a person retrieval system 100 according to a first exemplary embodiment of the present invention. Referring to FIG. 1, the person retrieval system 100 is configured to include a camera 110, an image server 120, a display device 130, a database 140, a retrieval device 150, and a registration device 160.

The camera 110 is an imaging device installed on a street where a plurality of persons and goods come and go, in a room, or the like for the purpose of crime prevention and monitoring. The camera 110 may image the same or different imaging areas from a fixed place in a fixed imaging direction. Alternatively, the camera 110 may be mounted on a mobile object such as a car and image the same or different imaging areas while moving. Any number of cameras 110 may be used. One camera 110 may be provided, or two or more cameras 110 imaging different imaging areas may be provided. The camera 110 may be a color camera that is equipped with a charge-coupled device (CCD) image sensor or a complementary MOS (CMOS) image sensor having a pixel capacity of about several millions pixels for example, and performs imaging continuously at a constant frame rate.

The image server 120 is connected to the camera 110 in a wired or wireless manner, and accumulates videos (moving images) configured of time-series images captured by the camera 110, for a past certain period of time. The image server 120 accumulates, for example, images captured by the camera 110 in frame image units. The image server 120 also accumulates each frame image in association with a camera ID that uniquely identifies the camera 110 used for capturing the frame image, and the imaging time.

The display device 130 is configured of a screen display device such as a liquid crystal display (LCD), and is configured to display, on a screen, various types of information such as a retrieval result according to an instruction from the retrieval device 150.

Figure 2:
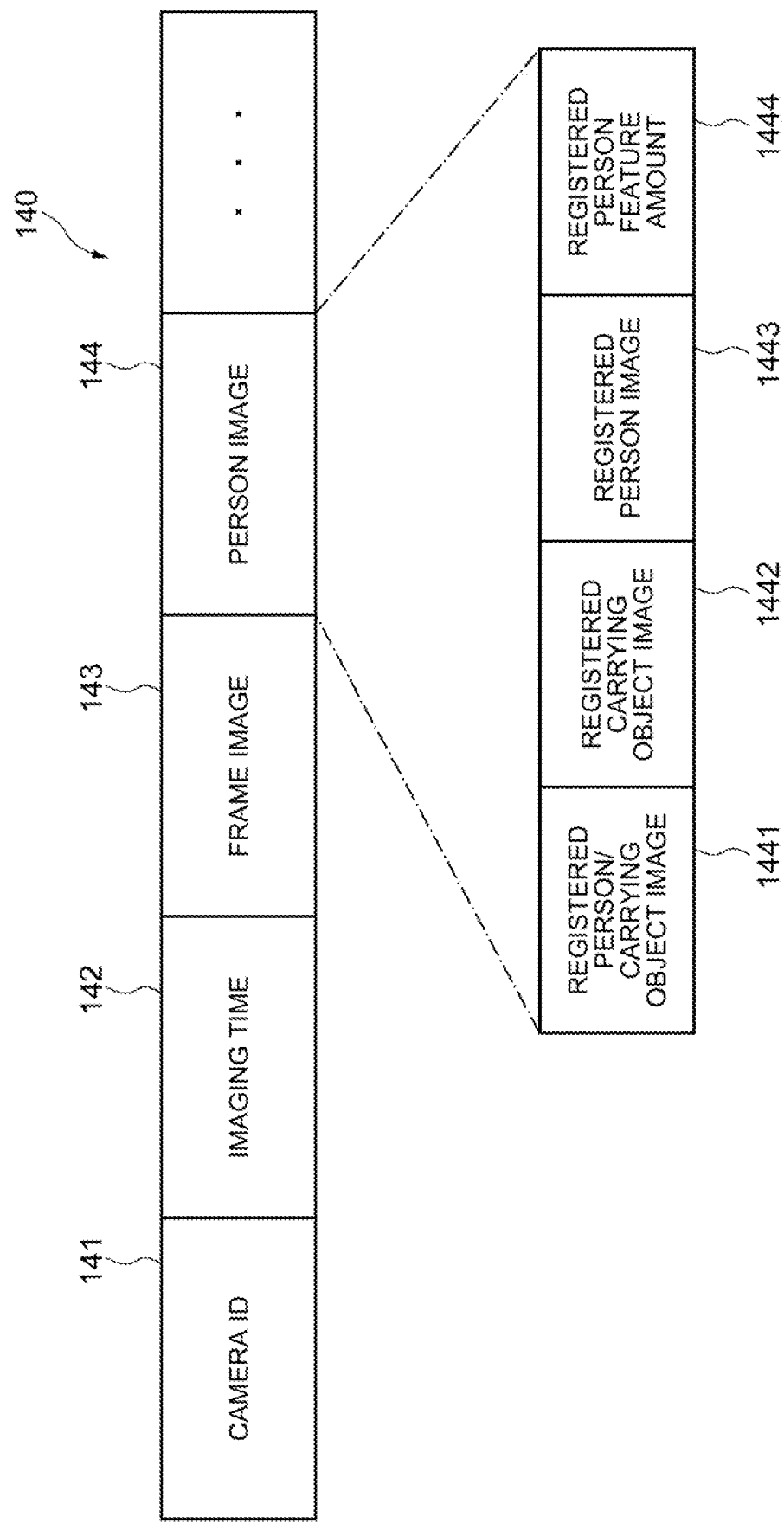
FIG. 2 is a block diagram illustrating an exemplary configuration of information stored in a database according to the first exemplary embodiment of the present invention.

The database 140 stores therein information according to a person to be retrieved. FIG. 2 illustrates an exemplary configuration of information stored in the database 140. In this example, the database 140 includes a plurality of entries each configured of a camera ID 141, an imaging time 142, a frame image 143, and person information 144. In the field of camera ID 141, a camera ID that uniquely identifies the camera 110 is set. In the fields of the imaging time 142 and the frame image 143, the imaging time of the camera 110 and a frame image that is captured at the imaging time are set, respectively. The fields of person information 144 are provided for the number of persons detected from the frame image 143.

Each piece of person information 144 is configured of a registered person/carrying object image 1441, a registered carrying object image 1442, a registered person image 1443, and a registered person feature amount 1444. In the field of registered person/carrying object image 1441, a person/carrying object image of a person detected from the frame image 143 is set. In a person/carrying object image, when a person takes a predetermined carrying object, the image other than the person includes an image of the carrying object. As a predetermined carrying object, a suitcase, a rucksack, or the like is defined in advance for example. However, any types or numbers of predetermined carrying objects are acceptable. Hereinafter, description will be given on the case where a backpack is a predetermined carrying object. In that case, for example, for a person with a backpack, an image in which the backpack and the person are integrated is set in the field of registered person/carrying object image 1441. In the field of registered carrying object image 1442, an image of the carrying object extracted from the registered person/carrying object image 1441 is set. When there is no image of the predetermined carrying object, the registered carrying object image 1442 is NULL. In the field of registered person image 1443, a person image in which processing is made on the image part of the registered carrying object image 1442 in the registered person/carrying object image 1441 so as to prevent a significant feature amount from being extracted, is set. The type of processing will be described below. In the field of the registered person feature amount 1444, a person feature amount extracted from the registered person image 1443 is set. The type of a person feature amount will be described below.

The retrieval device 150 is a device that searches a video captured by the camera 110 for a specific person. The retrieval device 150 includes an image acquisition unit 151, a person/carrying object image extraction unit 152, a carrying object image extraction unit 153, a person image calculation unit 154, a person feature amount extraction unit 155, and a determination unit 156.

The image acquisition unit 151 acquires a frame image constituting a video from the image server 120. For example, the image acquisition unit 151 acquires a frame image of the imaging time designated by the camera 110 designated by the operator, according to an instruction from the operator. Alternatively, the image acquisition unit 151 automatically acquires a frame image from the image server 120. A frame image acquired by the image acquisition unit 151 is also referred to as a query frame image.

Figure 3:
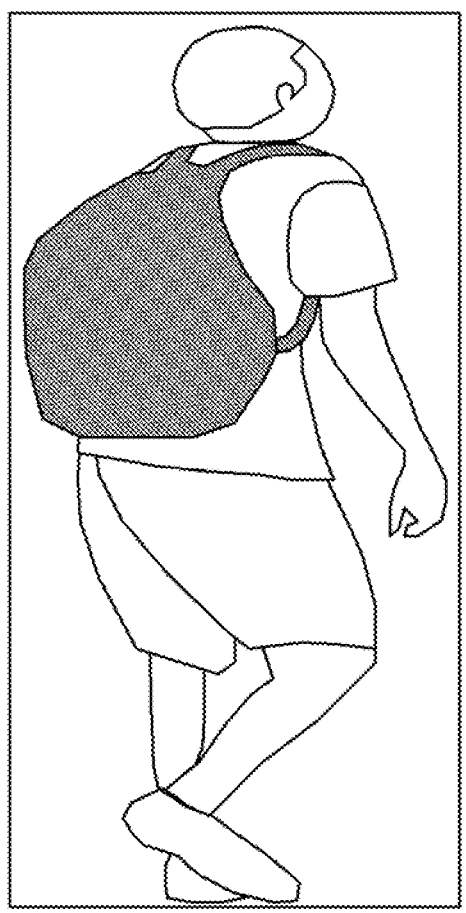
FIG. 3 schematically illustrates an example of a person/carrying object image according to the first exemplary embodiment of the present invention.

The person/carrying object image extraction unit 152 extracts a person/carrying object image from a query frame image. The person/carrying object image extraction unit 152 automatically extracts a person/carrying object image from a query frame image. Alternatively, the person/carrying object image extraction unit 152 extracts, as a person/carrying object image, an image within a range designated by the operator on the query frame image. FIG. 3 illustrates an example of a person/carrying object image. In this example, an image within a bounding rectangle of a person carrying a backpack on the back in the frame image is determined to be a person/carrying object image. A person/carrying object image extracted by the person/carrying object image extraction unit 152 is also referred to as a query person/carrying object image.

Figure 4:
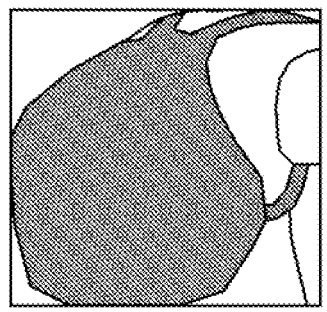
FIG. 4 schematically illustrates an example of a carrying object image according to the first exemplary embodiment of the present invention.

The carrying object image extraction unit 153 extracts an image of a carrying object of a perform from a query person/carrying object image. The carrying object to be extracted is determined previously (in this example, a backpack). The carrying object image extraction unit 153 automatically extracts an image of a carrying object from a query person/carrying object image. Alternatively, the carrying object image extraction unit 153 extracts, as a carrying object image, an image within a range designated by the operator on the query person/carrying object image. FIG. 4 illustrates an example of a carrying object image extracted from the person/carrying object image illustrated in FIG. 3. In this example, the inside of a bounding rectangle of a backpack is extracted as a carrying object image. Note that the image part of the backpack in the person/carrying object image may be extracted as a carrying object image through segmentation processing. A carrying object image extracted by the carrying object image extraction unit 153 is also referred to as a query carrying object image. Note that if there is no carrying object image in the query person/carrying object image, that is, when the person does not have any carrying object, a query carrying object image will not be extracted. In that case, a query carrying object image is NULL.

Figure 5:
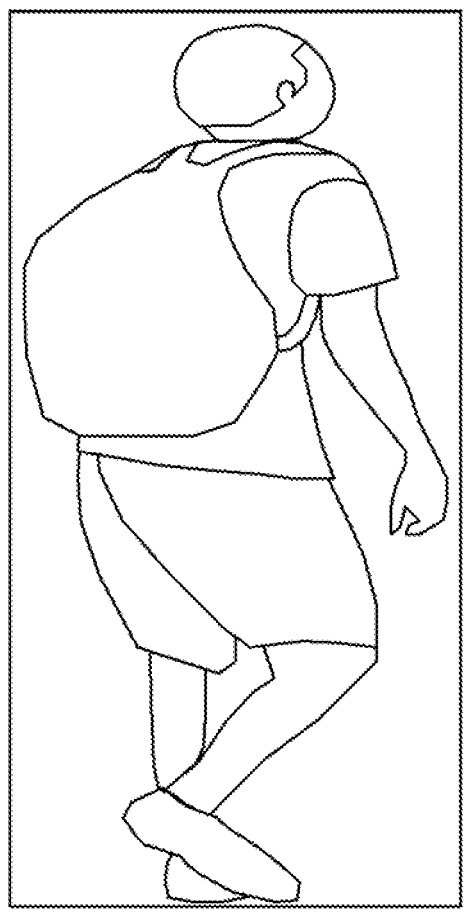
FIG. 5 schematically illustrates an example of a person image according to the first exemplary embodiment of the present invention.

The person image calculation unit 154 calculates a person image in which processing is made on the part of the query carrying object image in the query person/carrying object image 1441 so as to prevent a significant feature amount from being extracted. An example of the processing described above is to replace the pixel value of the part of the carrying object image with a value 0. Another example of the processing described above is to replace the weight of the part of the carrying object image with a minimum value. Another example of the processing described above is to replace the pixel value of the part of the carrying object image with a random value. Another example of the processing described above is to replace the part of the carrying object image with a noise image. FIG. 5 illustrates an example of a person image calculated by the person image calculation unit 154. In this example, a backpack image part is detected from the person/carrying object image illustrated in FIG. 3 through segmentation processing, and the pixel value of the backpack image part is replaced with a value 0. A person image extracted by the person image calculation unit 154 is also referred to as a query person image.

The person feature amount extraction unit 155 extracts a person feature amount from a query person image. The types of feature amounts to be extracted are determined previously. As a person feature amount, any feature amount may be used if it is one used as a feature amount of a person. For example, it is conceivable that the types of person feature amounts include the shape or direction of a contour of a person, the shape of an arm or a leg, the shape or direction of a contour of a face that is a representative site for specifying the person, the size, shape, and an arrangement relationship of main constituent elements such as an eye, a nose, and a mouth. However, one other than that may also be used. A person feature amount extracted by the person feature amount extraction unit 155 is also referred to as a query person feature amount.

The determination unit 156 compares, for each registered person feature amount 1444 of a person stored in the database 140, the query person feature amount with the registered person feature amount 1444, and calculates a score indicating the degree that the person of the query person image is the same as the person of the registered person image 1443. The registered person feature amount 1444 to be compared may be all registered person feature amounts 1444 stored in the database 140. Alternatively, the registered person feature amount 1444 to be compared may be the registered person feature amount 1444 of a person extracted from frame images captured by one or more cameras 110 having specific camera IDs selected according to an instruction of the operator. Alternatively, the registered person feature amount 1444 to be compared may be the registered person feature amount 1444 of a person extracted from a frame image included in the period of time of the imaging time designated by the operator.

Moreover, the determination unit 156 selects (creates) a retrieval result on the basis of the calculated score. For example, the determination unit 156 sorts the scores of the registered person feature amounts 1444 in the descending order, and selects n pieces of retrieval results corresponding to the top n pieces of scores of the registered person feature amounts 1444. Here, n represents a positive integer of 1 or larger, and may be a fixed value or a variable vale. Alternatively, the determination unit 156 selects one or a plurality of retrieval results corresponding to one or a plurality of registered person feature amounts 1444 having scores exceeding a predetermined score threshold. The determination unit 156 allows each retrieval result to include, for example, the registered person feature amount 1444, the registered person/carrying object image 1441, the registered carrying object image 1442, the registered person image 1443, the camera ID 141, the imaging time 142, and the frame image 143 corresponding thereto. However, the information included in each retrieval result may be information other than that described above. Further, the determination unit 156 displays the selected one or a plurality of retrieval result on the display device 130, or/and outputs to an external device not illustrated.

The registration device 160 records information of a person to be retrieved on the database 140, on the basis of videos accumulated in the image server 120. The registration device 160 includes an image acquisition unit 161, a person/carrying object image extraction unit 162, a carrying object image extraction unit 163, a person image calculation unit 164, a person feature amount extraction unit 165, and a storage control unit 166. Among them, the image acquisition unit 161, the person/carrying object image extraction unit 162, the carrying object image extraction unit 163, the person image calculation unit 164, and the person feature amount extraction unit 165 have functions similar to those of the image acquisition unit 151, the person/carrying object image extraction unit 152, the carrying object image extraction unit 153, the person image calculation unit 154, and the person feature amount extraction unit 155 in the retrieval device 150.

The storage control unit 166 stores, in the database 140, an entry configured of the frame image 143 acquired by the image acquisition unit 161, the person information 144 of each person detected from the frame image, the camera ID 141 of the camera capturing the frame image, and the imaging time 142 of the frame image 143. The person information 144 of the entry includes the registered person/carrying object image 1441 extracted by the person/carrying object image extraction unit 162, the registered carrying object image 1442 extracted by the carrying object image extraction unit 163, the registered person image 1443 calculated by the person image calculation unit 164, and the registered person feature amount 1444 extracted by the person feature amount extraction unit 165.

Figure 19:
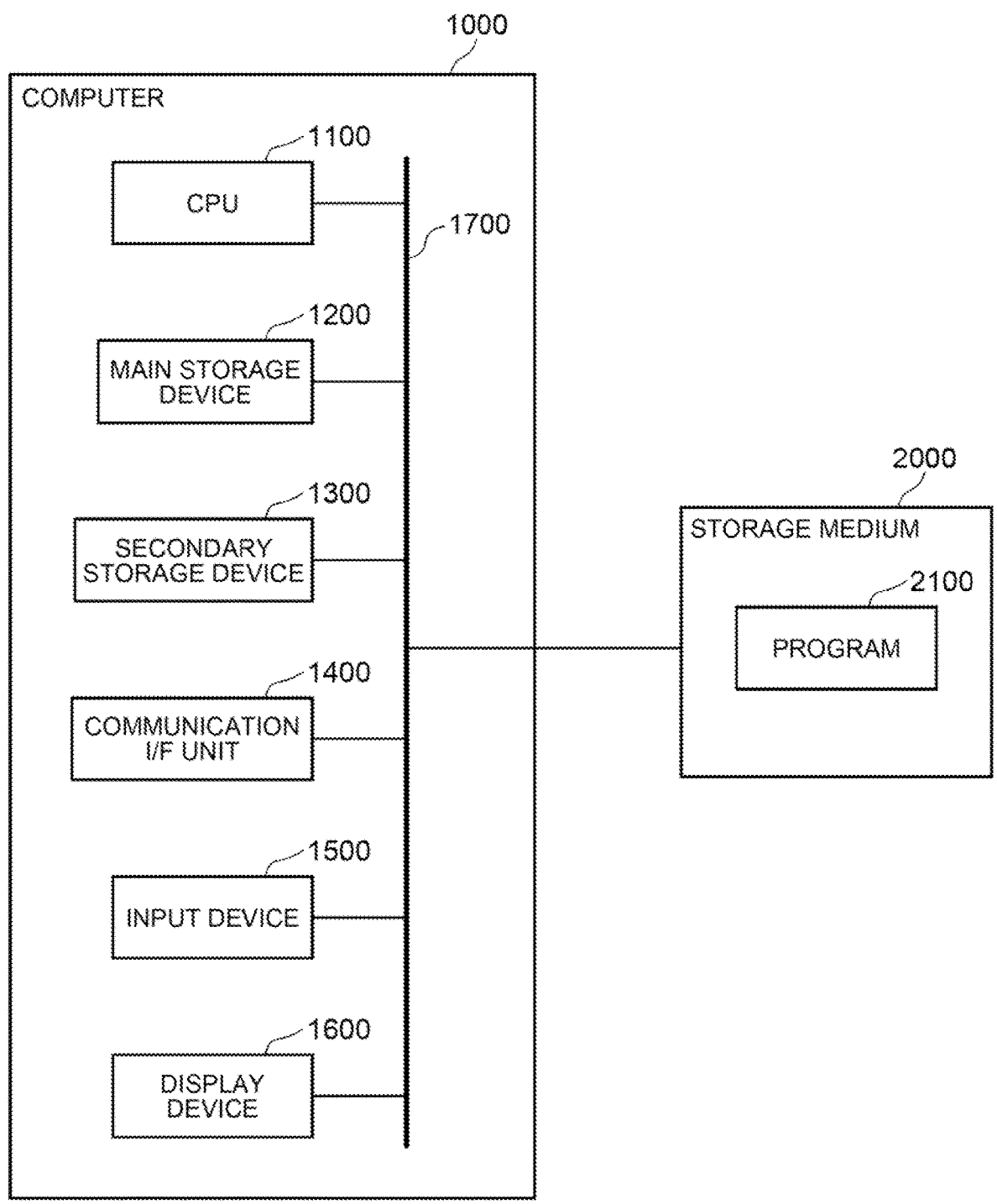
FIG. 19 is a block diagram illustrating a hardware configuration of a person retrieval system of the present invention.

Each of the retrieval device 150 and the registration device 160 as described above can be implemented by an information processing device configured of a computer 1000 and a storage medium 2000 as illustrated in FIG. 19 for example. The computer 1000 is configured of a CPU 1100, a main storage device 1200, a secondary storage device 1300, a communication I/F device 1400, an input device 1500, a display device 1600, a bus 1700 connecting them with one another, and the like. The storage medium 2000 stores thereon a program 2100. The program 2100 stored on the storage medium 2000 is installed in the secondary storage device 1300 when the computer 1000 is activated, and then read into the main storage device 1200 and executed by the CPU 1100 to thereby cause the computer 1000 to execute processing of each processing unit of the retrieval device 150 or the registration device 160.

Next, operation of the person retrieval system 100 will be described. Operation of the person retrieval system 100 is largely divided into a database update operation and a retrieval operation. The database update operation is performed by the registration device 160. The retrieval operation is performed by the retrieval device 150.

Figure 6:
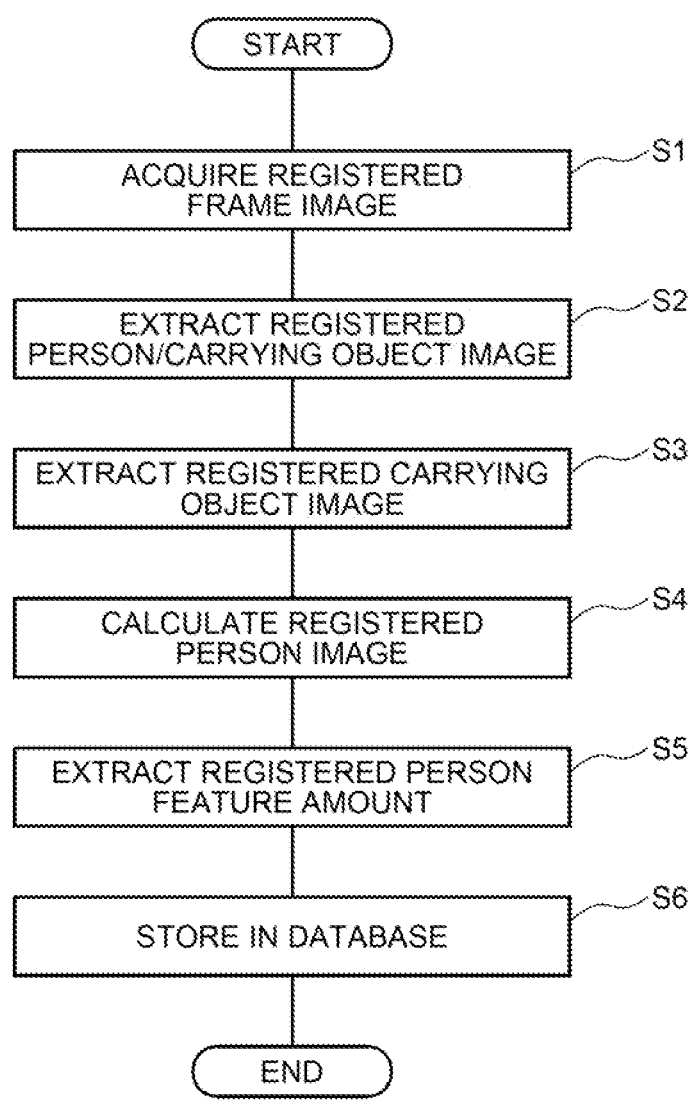
FIG. 6 is a flowchart illustrating an example of a database update operation of the person retrieval system according to the first exemplary embodiment of the present invention.

First, the database update operation will be described with reference to the flowchart of FIG. 6 illustrating an example of the processing. The registration device 160 initiates the processing illustrated in FIG. 6 each time the latest frame image captured by the camera 110 is accumulated in the image server 120. Alternatively, the registration device 160 initiates the processing illustrated in FIG. 6 each time a frame image to be searched is selected by the operator from the videos accumulated in the image server 120.

First, the image acquisition unit 161 acquires a frame image from the image server 120 (step S1). At that time, the image acquisition unit 161 acquires the camera ID of the camera 110 capturing the frame image and the imaging time of the frame image from the image server 120, along with the frame image. Then, the person/carrying object image extraction unit 162 extracts the registered person/carrying object image 1441 from the frame image acquired by the image acquisition unit 161 (step S2). Then, the carrying object image extraction unit 163 extracts the registered carrying object image 1442 from the registered person/carrying object image 1441 extracted by the person/carrying object image extraction unit 162 (step S3). Then, the person image calculation unit 164 calculates the registered person image 1443 in which processing is made on the part of the carrying object image in the person/carrying object image 1441 extracted by the person/carrying object image extraction unit 162 so as to prevent a significant feature amount from being extracted (step S4). Then, the person feature amount extraction unit 165 extracts the registered person feature amount 1444 from the registered person image 1443 calculated by the person image calculation unit 164 (step S5). Then, the storage control unit 166 adds, to the database 140, an entry configured of the frame image 143 acquired by the image acquisition unit 161, the person information 144 of each person detected from the frame image, the camera ID 141 of the camera capturing the frame image, and the imaging time 142 of the frame image 143 (step S6). The storage control unit 166 allows the person information 144 to include the registered person/carrying object image 1441 extracted by the person/carrying object image extraction unit 162, the registered carrying object image 1442 extracted by the carrying object image extraction unit 163, the registered person image 1443 calculated by the person image calculation unit 164, and the registered person feature amount 1444 extracted by the person feature amount extraction unit 165.

Figure 7:
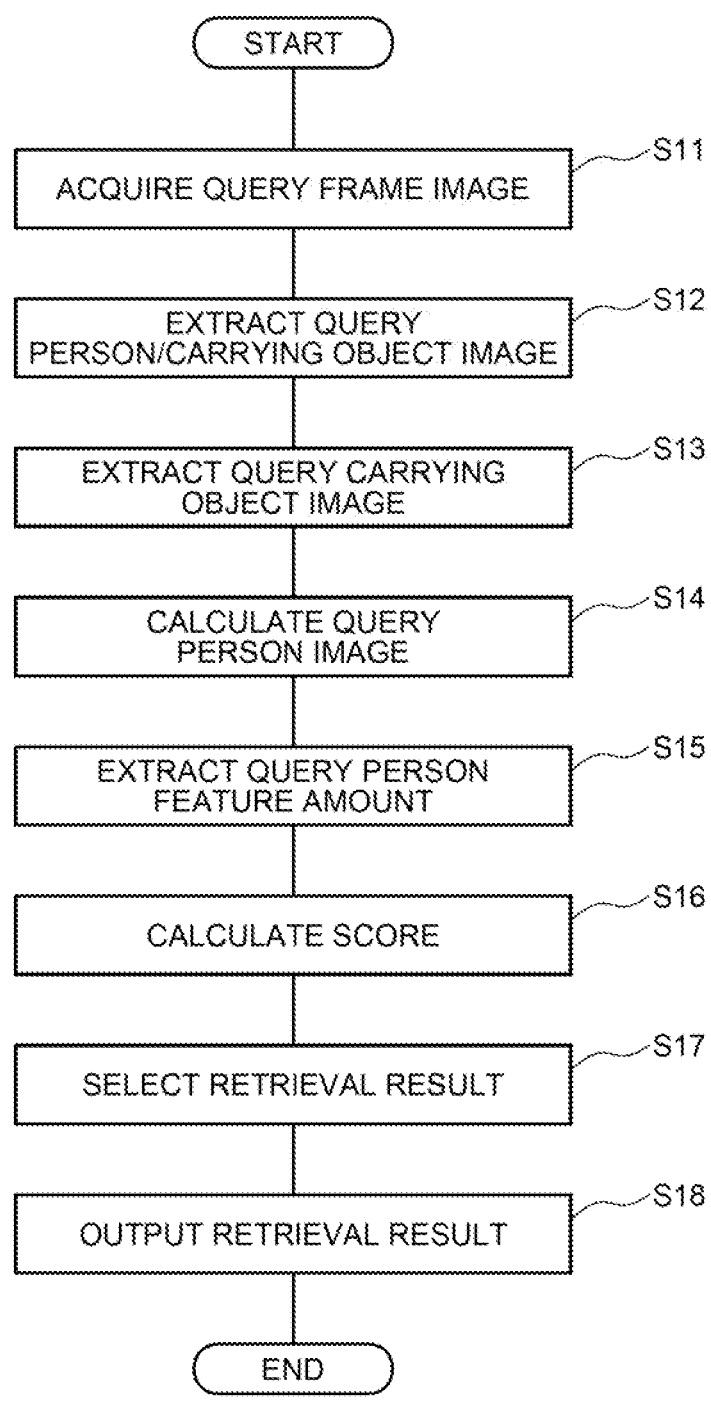
FIG. 7 is a flowchart illustrating an example of a retrieval operation of the person retrieval system according to the first exemplary embodiment of the present invention.

Next, the retrieval operation will be described with reference to the flowchart of FIG. 7 illustrating an example of the processing. When the retrieval device 150 is activated by an input from an input device not illustrated for example, the device initiates the processing illustrated in FIG. 7.

First, the image acquisition unit 151 acquires, from the image server 120, a frame image of the imaging time designated by the camera 110 designated by the operator, as a query frame image, according to an instruction from the operator for example (step S11). Then, the person/carrying object image extraction unit 152 extracts a query person/carrying object image from the query frame image according to an instruction from the operator for example (step S12). Then, the carrying object image extraction unit 153 extracts an image of a carrying object of the person from the query person/carrying object image, as a query carrying object image (step S13). Then, the person image calculation unit 154 calculates a query person image in which processing is made on the part of the query carrying object image in the query person/carrying object image so as to prevent a significant feature amount from being extracted (step S14). Then, the person feature amount extraction unit 155 extracts a query person feature amount from the query person image (step S15).

Then, the determination unit 156 compares, for each registered person feature amount 1444 stored in the database 140, the query person feature amount extracted by the person feature amount extraction unit 155 with the registered person feature amount 1444, and calculates a score indicating the degree that the person in the registered person image 1443 is the same as the person of the query person image (step S16). Then, on the basis of the calculated score, the determination unit 156 selects one or a plurality of retrieval results of the person in the registered person image having a high probability that the person is the same as the person in the query person image (step S17). Then, the determination unit 156 displays the selected one or a plurality of retrieval results on the display device 130 (step S18).

As described above, when a person to be retrieved has a predetermined carrying object such as a backpack, the retrieval device 150 calculates a query person image in which the part of the query carrying object image in the query person/carrying object image of the person including the image of the carrying object is processed so as to prevent a significant feature amount from being extracted, and extracts the query person feature amount from the calculated query person image. Further, the retrieval device 150 compares the query person feature amount with the registered person feature amount of the registered person image stored in the database 140 to thereby calculate the score indicating the degree that the person to be retrieved is the person of the retrieval target. Then, on the basis of the calculated score, the retrieval device 150 selects one or a plurality of retrieval results. As a result, the possibility that the retrieval device 150 fails to retrieve the same person due to an influence of the carrying object is reduced. That is, it is possible to reduce the case where a registered person image of the same person not having any carrying object or a registered person image of the same person carrying another carrying object that is different in color or shape is excluded from the retrieval result. Moreover, it is possible to reduce the case where a registered person image of another person carrying an object similar to those carried by the person to be retrieved is included in the retrieval result.

Further, when the person to be registered has predetermined carrying object such as a backpack, the registration device 160 calculates a registered person image in which the image part of the carrying object in the extracted registered person/carrying object image is processed so as to prevent a significant feature amount from being extracted, and extracts the registered person feature amount from the calculated registered person image. Then, the registration device 160 stores the registered person feature amount in the database 140. Thereby, when the person to be registered has a predetermined carrying object such as a backpack, as compared with the configuration of extracting the registered person feature amount from an image of a person including the carrying object image and storing it in the database 140, the possibility that the retrieval device 150 fails to retrieve the same person due to an influence of the carrying object is further reduced.

Next, an exemplary configuration of the determination unit 156 will be described.

Figure 8:
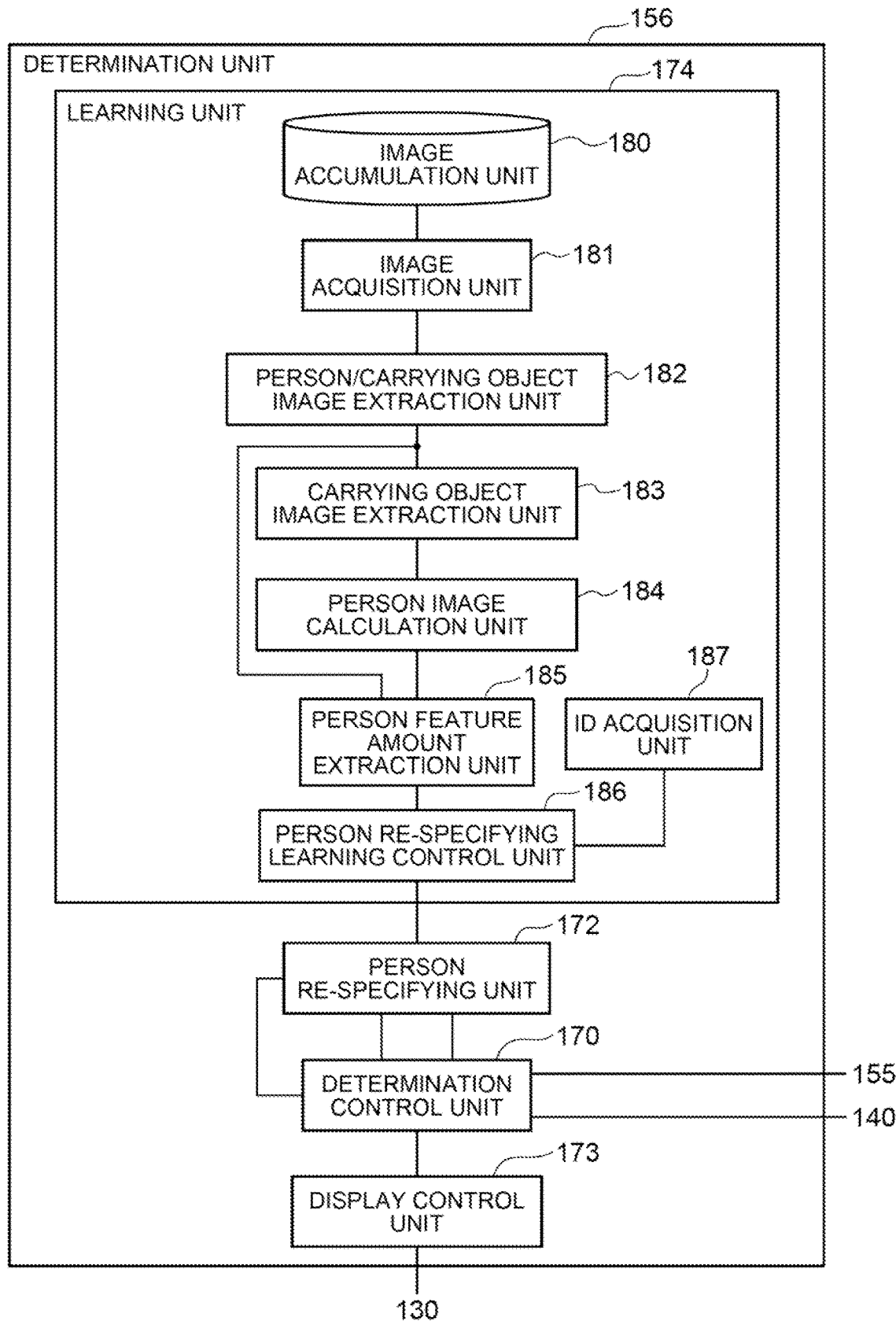
FIG. 8 is a block diagram illustrating an example of a determination unit according to the first exemplary embodiment of the present invention.

FIG. 8 is a block diagram illustrating an example of the determination unit 156. Referring to FIG. 8, the determination unit 156 is configured of a determination control unit 170, a person re-specifying unit 172, a display control unit 173, and a learning unit 174.

The person re-specifying unit 172 receives the query person feature amount extracted by the person feature amount extraction unit 155 and the registered person feature amount acquired from the database 140, and calculates a score indicating the degree that the person in the query person image having the query person feature amount and the person in the registered person image having the registered person feature amount are the same. The person re-specifying unit 172 is configured to, for example, by inputting the query person feature amount and the registered person feature amount to a learning model having been learned by machine-learning for estimating whether a pair of person feature amounts are the person feature amounts of the same person, acquire an estimation probability of whether or not they are the person feature amounts of the same person, from the learned model. The learning model can be generated in advance through machine learning using a machine learning algorism such as a neural network by using various pairs of person feature amounts of the same person and various pairs of person feature amounts of different persons as teacher data.

The learning unit 174 is a means for allowing the learning model of the person re-specifying unit 172 to be machine-learned. The learning unit 174 includes an image accumulation unit 180, an image acquisition unit 181, a person/carrying object image extraction unit 182, a carrying object image extraction unit 183, a person image calculation unit 184, a person feature amount extraction unit 185, a person re-specifying learning control unit 186, and an ID acquisition unit 187.

The image accumulation unit 180 accumulates therein a plurality of images for learning. In the image accumulation unit 180, various types of images of a person that is uniquely identified by a person ID are accumulated in association with the person ID. A plurality of images of the same person differ from one another in the orientation of the person, the orientation of the face, the clothes type, presence or absence and types of a carrying object such as a backpack.

The image acquisition unit 181, the person/carrying object image extraction unit 182, the carrying object image extraction unit 183, and the person image calculation unit 184 have functions similar to those of the image acquisition unit 151, the person/carrying object image extraction unit 152, the carrying object image extraction unit 153, and the person image calculation unit 154 in the retrieval device 150. The person feature amount extraction unit 185 extracts a predetermined person feature amount from a person image calculated by the person image calculation unit 184, that is, from a person image in which processing is made on the image part of the carrying object in the person/carrying object image so as to prevent a significant feature amount from being extracted. Further, the person feature amount extraction unit 185 extracts a predetermined person feature amount from a person/carrying object image extracted by the person/carrying object image extraction unit 182. With respect to an image of a person having the same person ID, the ID acquisition unit 187 outputs the same person ID to the person re-specifying learning control unit 186. The person re-specifying learning control unit 186 uses the person feature amount extracted by the person feature amount extraction unit 185 and the person ID output by the ID acquisition unit 187 to control machine learning of the person re-specifying unit 172. That is, the person re-specifying learning control unit 186 previously generates a learning model of the person re-specifying unit 172 through machine learning using a machine learning algorism such as a neural network by using various pairs of person feature amounts of the same person and various pairs of person feature amounts of different persons as teacher data.

The determination control unit 170 supplies a query person feature amount extracted by the person feature amount extraction unit 155 to one input of the person re-specifying unit 172, supplies a registered person feature amount acquired from the database 140 to the other input of the person re-specifying unit 172, and repeats the operation of acquiring an estimation result output from the person re-specifying unit 172 by exchanging the registered person feature amount as appropriate to thereby acquire the estimation probability of each registered person feature amount as a score. The determination control unit 170 also sorts the acquired scores in a descending order and transmits n pieces of retrieval results corresponding to the top n pieces of scores to the display control unit 173. The display control unit 173 performs control to display those n pieces of retrieval results on the display device 130.

As described above, the determination unit 156 includes the person re-specifying unit 172 that receives, as inputs, the query person feature amount and the registered person feature amount in the database 140, and calculates a score indicating the degree that the person in the query person image having the query person feature amount and the person in the registered person image having the registered person feature amount are the same person. Then, the person re-specifying unit 172 includes a learning model that is machine-learned by using a person feature amount extracted from a person image in which processing is made on the image part of the carrying object in the person/carrying object image so as to prevent a significant feature amount from being extracted. As a result, the possibility that the determination unit 156 fails to determine the same person due to an influence of the carrying object is reduced.

Second Exemplary Embodiment

Next, a person retrieval system 200 according to a second exemplary embodiment of the present invention will be described with reference to the drawings.

In the person retrieval system 100 according to the first exemplary embodiment of FIG. 1, retrieval of the same person is performed regardless of presence or absence of a carrying object or a difference in the carrying object. Meanwhile, the person retrieval system 200 of the present embodiment realizes retrieval processing to retrieve the same person having the same carrying object and retrieval processing to retrieve the same person not having the same carrying object, in addition to the retrieval having been described above. Which retrieval processing is to be performed may be designated by a user as a retrieval condition in each retrieval request, or may be set in advance fixedly. Hereinafter, retrieval processing to retrieve an image of the same person regardless of presence or absence of a carrying object or a difference in the carrying object is referred to as first retrieval processing, retrieval processing to retrieve the same person carrying the same carrying object is referred to as second retrieval processing, and retrieval processing to retrieve the same person not having the same carrying object is referred to as third retrieval processing.

Figure 9:
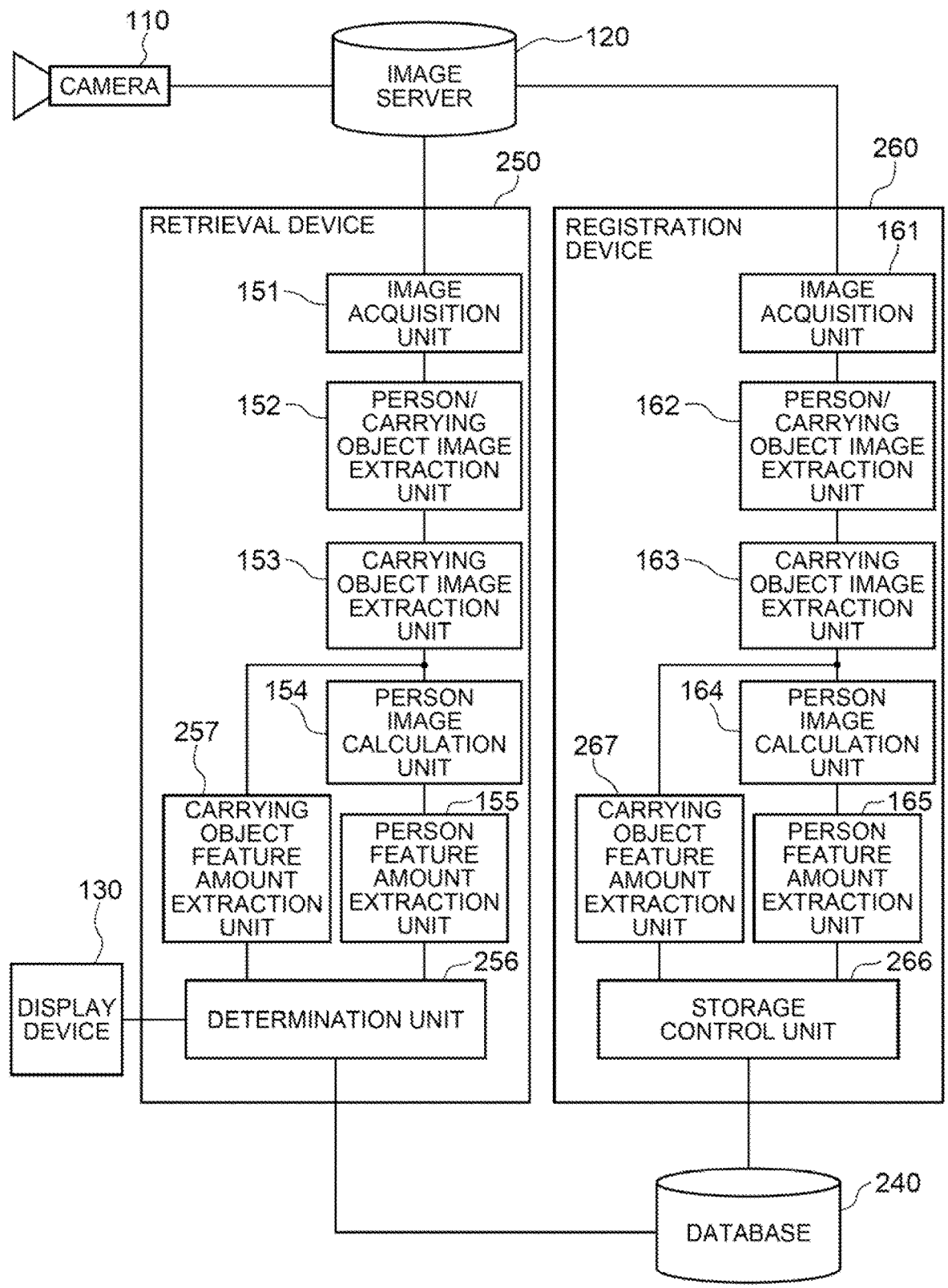
FIG. 9 is a block diagram of a person retrieval system according to a second exemplary embodiment of the present invention.

FIG. 9 is a block diagram of the person retrieval system 200 according to the second exemplary embodiment of the present invention, in which the reference numerals that are the same as those in FIG. 1 denote the same parts. As compared with the person retrieval system 100 of FIG. 1, the person retrieval system 200 differs in that it includes a database 240, a retrieval device 250, and a registration device 260, and the other parts are the same.

Figure 10:
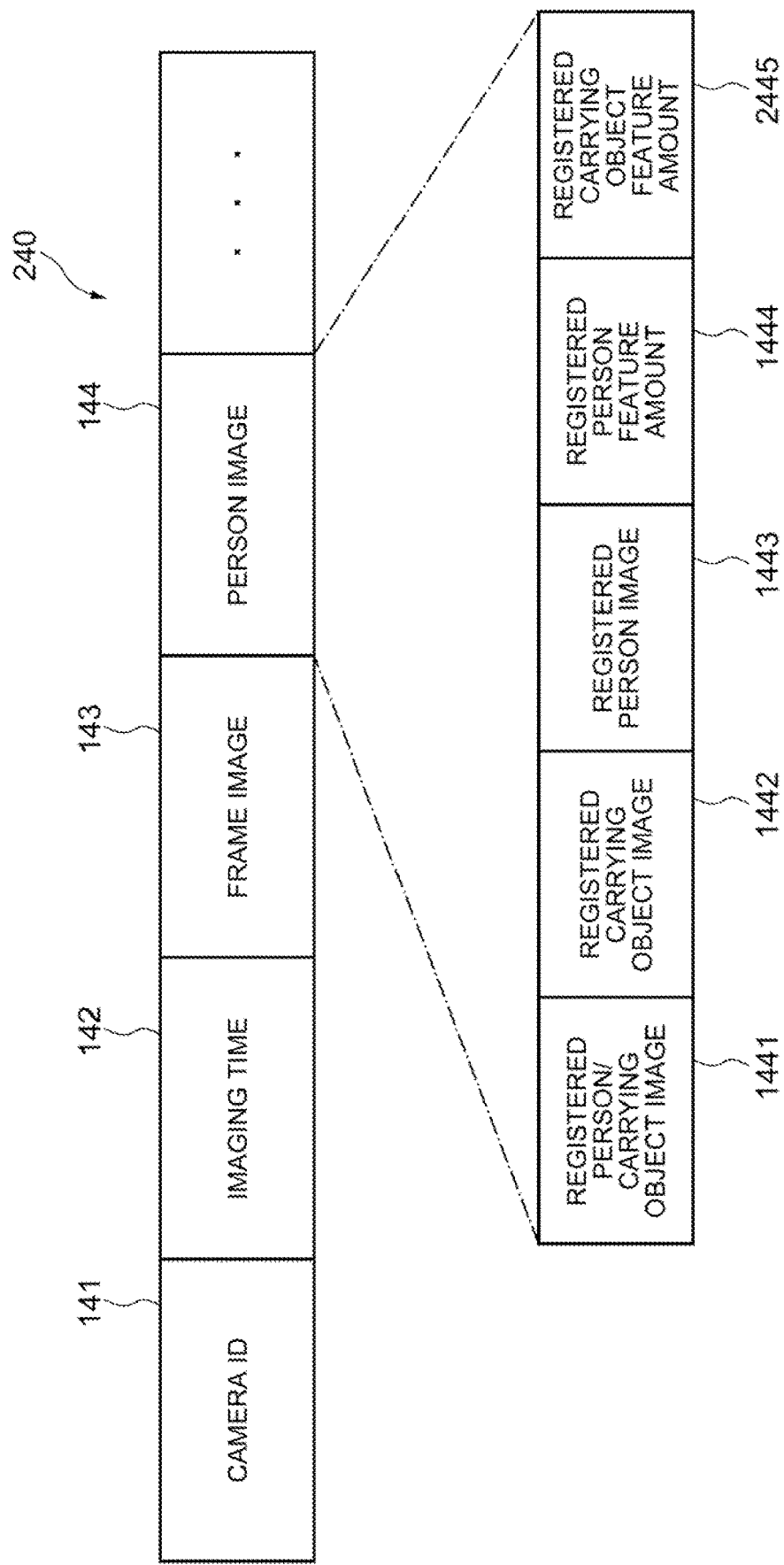
FIG. 10 illustrates an exemplary configuration of information stored in a database according to the second exemplary embodiment of the present invention.

FIG. 10 illustrates an exemplary configuration of information stored in the database 240. As compared with the database 140 of FIG. 2, the database 240 differs in that each piece of person information 144 further includes a registered carrying object feature amount 2445. The other points are the same.

As compared with the retrieval device 150 of FIG. 1, the retrieval device 250 differs in that it includes a carrying object feature amount extraction unit 257 and a determination unit 256. The other points are the same.

The carrying object feature amount extraction unit 257 extracts a carrying object feature amount from a query carrying object image extracted by the carrying object image extraction unit 153. The types of feature amounts to be extracted are determined previously. As a carrying object feature amount, any feature amount may be used if it is one used as a feature amount of an object. For example, the feature amount of a carrying object may be the shape of the contour or orientation of the carrying object, a color histogram, or the like, or may be another one. The carrying object feature amount extracted by the carrying object feature amount extraction unit 257 is also referred to as a query carrying object feature amount.

First, through processing similar to that performed by the determination unit 156, the determination unit 256 first selects (creates) one or a plurality of retrieval results of the person in the registered person image having a high probability that the person is the same as the person in the query person image. Each retrieval result selected by the determination unit 256 includes, for example, the registered person/carrying object image 1441, the registered carrying object image 1442, the registered person image 1443, the registered person feature amount 1444, the registered carrying object feature amount 2445, the camera ID 141, the imaging time 142, and the frame image 143. Then, the determination unit 256 stores the selected retrieval result in a retrieval result group.

Then, the determination unit 256 determines which of the first retrieval processing, the second retrieval processing, and the third retrieval processing, the retrieval processing is. In the case of the first retrieval processing, the determination unit 256 displays one or more retrieval results stored in the retrieval result set on the display device 130, or/and outputs them to an external device not illustrated, and ends the retrieval processing.

In the case of the second retrieval processing, the determination unit 256 checks whether or not the query carrying object image is NULL, and when it is NULL, the determination unit 256 displays an error message indicating that no query carrying object image is detected on the display device 130, or/and outputs it to an external device not illustrated. Then, the retrieval processing ends. On the other hand, when the query carrying object image is not NULL, the determination unit 256 performs the processing as described below.

First, the determination unit 256 focuses on one retrieval result in the retrieval result set. Then, the determination unit 256 checks whether or not the registered carrying object image 1442 included in the focused retrieval result is NULL, and when it is NULL, the determination unit 256 deletes the retrieval result from the retrieval result set. When the registered carrying object image 1442 is not NULL, the determination unit 256 compares the query carrying object feature amount with the registered carrying object feature amount 2445 included in the focused retrieval result, and determines whether or not the carrying object in the query carrying object image and the carrying object in the registered carrying object image 1442 are the same. Then, the determination unit 256 deletes the focused retrieval result determined that the carrying objects in the two images are not the same from the retrieval result set, while keep the focused retrieval result determined that the carrying objects in the two images are the same in the retrieval result set. Then, the determination unit 256 moves the focus to another retrieval result in the retrieval result set, and repeats the same processing as that described above. Then, when the determination unit 156 completes focusing on all retrieval results in the retrieval result set, the determination unit 256 displays the retrieval results stored in the retrieval result set on the display device 130, or/and outputs them to an external device not illustrated, and ends the retrieval processing.

In the case of the third retrieval processing, the determination unit 256 checks whether or not the query carrying object image is NULL, and when it is NULL, the determination unit 256 displays an error message indicating that no query carrying object image is detected on the display device 130, or/and outputs it to an external device not illustrated, and ends the retrieval processing. On the other hand, when the query carrying object image is not NULL, the determination unit 256 performs the processing as described below.

First, the determination unit 256 focuses on one retrieval result in the retrieval result set. Then, the determination unit 256 checks whether or not the registered carrying object image 1442 included in the focused retrieval result is NULL. When it is NULL, since the same carrying object is not held, the determination unit 256 keeps the retrieval result in the retrieval result set. When the registered carrying object image 1442 is not NULL, the determination unit 256 compares the query carrying object feature amount with the registered carrying object feature amount 2445 included in the focused retrieval result, and determines whether or not the carrying object in the query carrying object image and the carrying object in the registered carrying object image 1442 are the same. Then, the determination unit 256 deletes the focused retrieval result determined that the carrying objects in the two images are the same from the retrieval result set, while keeps the focused retrieval result determined that the carrying objects in the two images are not the same in the retrieval result set. Then, the determination unit 256 moves the focus to another retrieval result in the retrieval result set, and repeats the same processing as that described above. Then, when the determination unit 156 completes focusing on all retrieval results in the retrieval result set, the determination unit 256 displays the retrieval results stored in the retrieval result set on the display device 130, or/and outputs them to an external device not illustrated, and ends the retrieval processing.

As compared with the registration device 160 of FIG. 1, the registration device 260 differs in that it includes a carrying object feature amount extraction unit 267 and a storage control unit 266. The other points are the same.

The carrying object feature amount extraction unit 267 extracts a carrying object feature amount from a registered carrying object image extracted by the carrying object image extraction unit 163, as similar to the carrying object feature amount extraction unit 257.

The storage control unit 266 stores, in the database 240, an entry configured of the frame image 143 acquired by the image acquisition unit 161, the person information 144 of each person detected by the person/carrying object image extraction unit 162, the camera ID 141 of the camera capturing the frame image, and the imaging time 142 of the frame image 143. The person information 144 of the entry includes the registered person/carrying object image 1441 extracted by the person/carrying object image extraction unit 162, the registered carrying object image 1442 extracted by the carrying object image extraction unit 163, the registered person image 1443 calculated by the person image calculation unit 164, the registered person feature amount 1444 extracted by the person feature amount extraction unit 165, and the registered carrying object feature amount 2445 extracted by the carrying object feature amount extraction unit 267.

Each of the retrieval device 250 and the registration device 260 as described above can be realized by an information processing device configured of a computer 1000 and a storage medium 2000 as illustrated in FIG. 19 for example, as similar to the retrieval device 150 and the registration device 160.

Next, operation of the person retrieval system 200 will be described. Operation of the person retrieval system 200 is largely divided into a database update operation and a retrieval operation. The database update operation is performed by the registration device 260. The retrieval operation is performed by the retrieval device 250.

Figure 11:
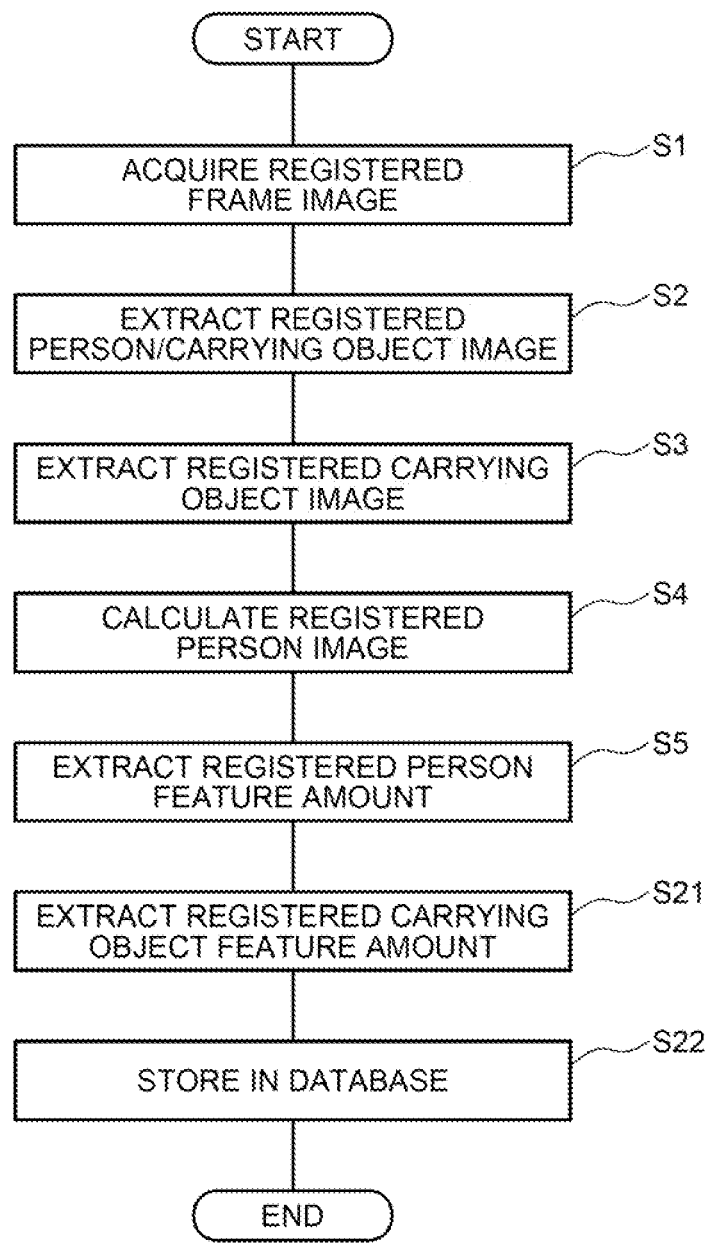
FIG. 11 is a flowchart illustrating an example of a database update operation of the person retrieval system according to the second exemplary embodiment of the present invention.

First, the database update operation will be described with reference to the flowchart of FIG. 11 illustrating an example of the processing. Upon initiation of the processing illustrated in FIG. 11, the registration device 260 first executes processing of steps S1 to S5 as similar to the registration device 160. Then, the carrying object feature amount extraction unit 267 of the registration device 260 extracts the registered carrying object feature amount 2445 from the registered carrying object image extracted by the carrying object image extraction unit 163 (step S21). Then, the storage control unit 266 stores, in the database 240, an entry configured of the frame image 143 acquired by the image acquisition unit 161, the person information 144 of each person detected from the frame image, the camera ID 141 of the camera capturing the frame image, and the imaging time 142 of the frame image 143. The storage control unit 266 allows the person information 144 of the entry to include the registered person/carrying object image 1441 extracted by the person/carrying object image extraction unit 162, the registered carrying object image 1442 extracted by the carrying object image extraction unit 163, the registered person image 1443 calculated by the person image calculation unit 164, the registered person feature amount 1444 extracted by the person feature amount extraction unit 165, and the registered carrying object feature amount 2445 extracted by the carrying object feature amount extraction unit 267.

Figure 12:
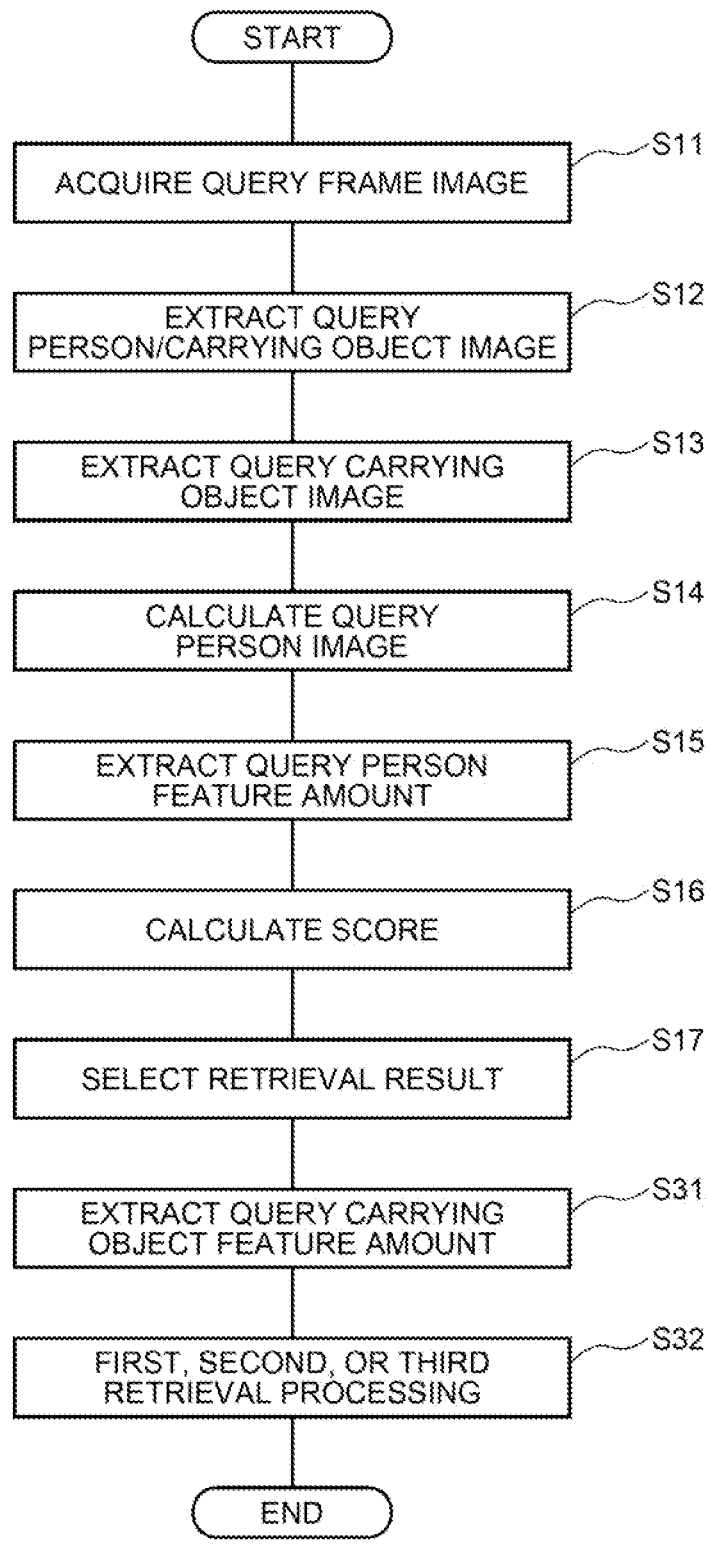
FIG. 12 is a flowchart illustrating an example of a retrieval operation of the person retrieval system according to the second exemplary embodiment of the present invention.

Next, the retrieval operation will be described with reference to the flowchart of FIG. 12 illustrating an example of the processing. Upon initiation of the processing illustrated in FIG. 12, the retrieval device 250 first executes processing of steps S11 to S17 as similar to the retrieval device 150.

Then, the carrying object feature amount extraction unit 257 of the retrieval device 250 extracts the carrying object feature amount from the query carrying object image extracted by the carrying object image extraction unit 153 as a query carrying object feature amount (step S31).

Then, the determination unit 256 of the retrieval device 250 executes any one of the first retrieval processing, the second retrieval processing, and the third retrieval processing (step S32). In the first retrieval processing, the determination unit 256 displays the retrieval result selected at step S17 on the display device 130 for example, as a retrieval result of a person in the registered person image having a high probability that the person is the same as the person in the query person image, regardless of presence or absence of a carrying object and a difference in the carrying object. In the second retrieval processing, the determination unit 256 extracts, from among the retrieval results selected at step S17, only a retrieval result of the same person carrying the same carrying object as that in the query carrying object image, and displays it on the display unit 130 for example. In the third retrieval processing, the determination unit 256 extracts, from among the retrieval results selected at step S17, only a retrieval result of the same person not carrying the same carrying object as that in the query carrying object image, and displays it on the display unit 130 for example.

Next, an exemplary configuration of the determination unit 256 will be described.

Figure 13:
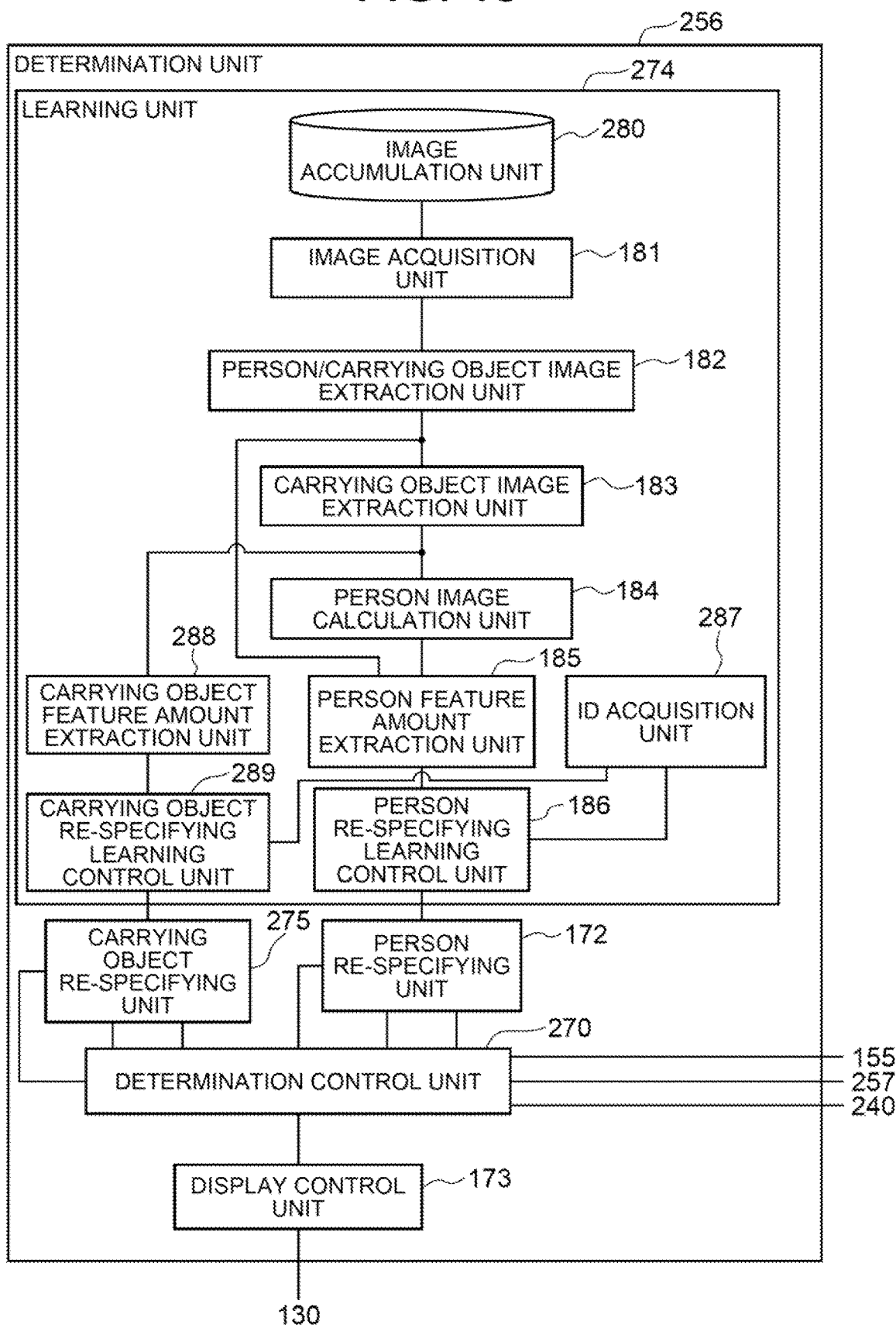
FIG. 13 is a block diagram illustrating an example of a determination unit according to the second exemplary embodiment of the present invention.

FIG. 13 is a block diagram illustrating an example of the determination unit 256. Referring to FIG. 13, the determination unit 256 is configured of a determination control unit 270, a person re-specifying unit 172, a display control unit 173, a learning unit 274, and a carrying object re-specifying unit 275. The determination control unit 270, the learning unit 274, and the carrying object re-specifying unit 275 are different from the parts of the determination unit 156 of FIG. 8.

The carrying object re-specifying unit 275 receives, as inputs, the query carrying object feature amount extracted by the carrying object feature amount extraction unit 257 and the registered carrying object feature amount 2445 acquired from the database 240, and calculates a score indicating the degree that the carrying object in the query carrying object image having the query carrying object feature amount and the carrying object in the registered carrying object image 1442 having the registered carrying object feature amount 2445 are the same. The carrying object re-specifying unit 275 is configured to, for example, by inputting the query carrying object feature amount and the registered carrying object feature amount 2445 to a learning model having been learned by machine-learning for estimating whether a pair of carrying object feature amounts are the carrying object feature amounts of the same carrying object, to thereby acquire, from the learned model, an estimation probability of whether or not they are carrying object feature amounts of the same carrying object. The learning model can be generated in advance through machine learning using a machine learning algorism such as a neural network by using various pairs of carrying object feature amounts of the same carrying object and various pairs of carrying object feature amounts of different carrying objects as teacher data.

The learning unit 274 is a means for allowing the learning model of the person re-specifying unit 172 and the carrying object re-specifying unit 275 to be machine-learned. The learning unit 274 includes an image accumulation unit 280, an image acquisition unit 181, a person/carrying object image extraction unit 182, a carrying object image extraction unit 183, a person image calculation unit 184, a person feature amount extraction unit 185, a person re-specifying learning control unit 186, an ID acquisition unit 287, a carrying object feature amount extraction unit 288, and a carrying object re-specifying learning control unit 289. Among them, the image accumulation unit 280, the ID acquisition unit 287, the carrying object feature amount extraction unit 288, and the carrying object re-specifying learning control unit 289 are different from the parts of the learning unit 174 of FIG. 8, and the other parts are the same.

The image accumulation unit 280 accumulates therein a plurality of images for learning. In the image accumulation unit 280, various types of images of a person that is uniquely identified by a person ID are accumulated in association with the person ID, as similar to the image accumulation unit 180. In the image accumulation unit 280, various types of images of a carrying object (images of a person including the images of a carrying object) that are uniquely identified by the carrying object ID are accumulated in association with the carrying object ID. A plurality of images of the same carrying object differ from one another in the orientation of the carrying object, the type and color of the outer appearances, and the like.

The carrying object feature amount extraction unit 288 extracts a carrying object feature amount from a carrying object image extracted by the carrying object image extraction unit 183, as similar to the carrying object feature amount extraction unit 257. With respect to an image of a person having the same person ID, the ID acquisition unit 287 outputs the same person ID to the person re-specifying learning control unit 186. With respect to an image of a carrying object having the same carrying object ID, the ID acquisition unit 287 outputs the same carrying object ID to the carrying object re-specifying learning control unit 289. The carrying object re-specifying learning control unit 289 uses the carrying object feature amount extracted by the carrying object feature amount extraction unit 288 and the carrying object ID output by the ID acquisition unit 287 to control machine learning of the carrying object re-specifying unit 275. That is, the carrying object re-specifying learning control unit 289 previously generates a learning model of the carrying object re-specifying unit 275 through machine learning using a machine learning algorism such as a neural network by using various pairs of carrying object feature amounts of the same carrying object and various pairs of carrying object feature amounts of different carrying object as teacher data.

First, through the person re-specifying processing using the person re-specifying unit 172 as similar to the determination control unit 170, the determination control unit 270 selects one or more retrieval results of the person in the registered person image 1443 having a high probability that the person is the same as the person in the query person image, and stores them in the retrieval result set. Then, the determination control unit 270 executes any one of the first retrieval processing, the second retrieval processing, and the third retrieval processing. In the first retrieval processing, the determination unit 256 displays the retrieval result stored in the retrieval result set on the display device 130 through the display control unit 173, as a retrieval result of the person in the registered person image having a high probability that the person is the same as the person in the query person image, regardless of presence or absence of a carrying object and a difference in the carrying object. In the second retrieval processing, the determination unit 256 extracts, from among the retrieval results stored in the retrieval result set, only a retrieval result of the same person having the same carrying object as that in the query carrying object image, and displays it on the display unit 130 via the display control unit 173. In the third retrieval processing, the determination unit 256 extracts, from among the retrieval results stored in the retrieval result set, only a retrieval result of the same person not having the same carrying object as that in the query carrying object image, and displays it on the display unit 130 via the display control unit 173.

In the second and third retrieval processing, the determination control unit 270 performs determination of whether or not the same carrying object as that in the query carrying object image is held, by using the carrying object re-specifying unit 275. That is, the determination control unit 270 supplies the query carrying object feature amount extracted by the carrying object feature amount extraction unit 257 to one input of the carrying object re-specifying unit 275, and supplies the registered carrying object feature amount 2445 in the retrieval result to the other input of the carrying object re-specifying unit 275, and compares the score of the estimation result output from the carrying object re-specifying unit 275 with a predetermined threshold. Then, when the score exceeds the threshold, the determination control unit 270 determines that the two carrying objects are the same, while when the score is equal to or lower than the threshold, the determination control unit 270 determines that the two carrying objects are not the same and are different.

Third Exemplary Embodiment

Next, a person retrieval system 300 according to a third exemplary embodiment of the present invention will be described with reference to the drawings.

In the person retrieval system 100 according to the first exemplary embodiment of FIG. 1, retrieval of the same person is performed using a query person feature amount, regardless of presence or absence of a carrying object or a difference in the carrying object. Meanwhile, in the person retrieval system 300 of the present embodiment, the same person is retrieved by using a query person/carrying object feature amount in which a query person feature amount and a query carrying object feature amount are integrated, in addition to the above-described configuration. Which retrieval processing is to be performed may be designated by a user as a retrieval condition in each retrieval request, or may be set in advance fixedly. Hereinafter, retrieval processing using a query person feature amount is referred to as first retrieval processing, and retrieval processing using a query person/carrying object feature amount is referred to as fourth retrieval processing.

Figure 14:
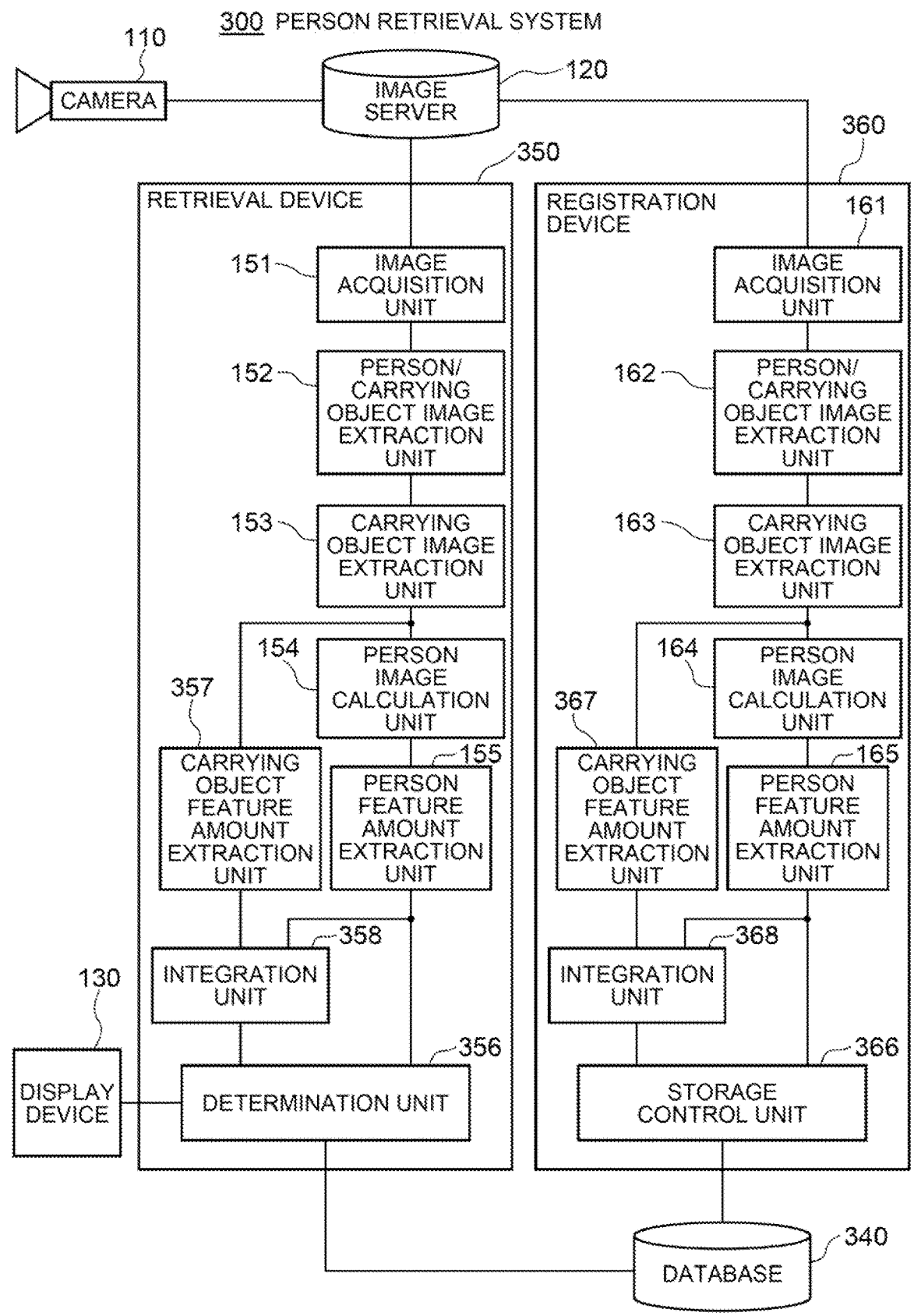
FIG. 14 is a block diagram of a person retrieval system according to a third exemplary embodiment of the present invention.

FIG. 14 is a block diagram of the person retrieval system 300 according to the third exemplary embodiment of the present invention, in which the reference numerals that are the same as those in FIG. 1 denote the same parts. As compared with the person retrieval system 100 of FIG. 1, the person retrieval system 300 differs in that it includes a database 340, a retrieval device 350, and a registration device 360. The other parts are the same.

Figure 15:
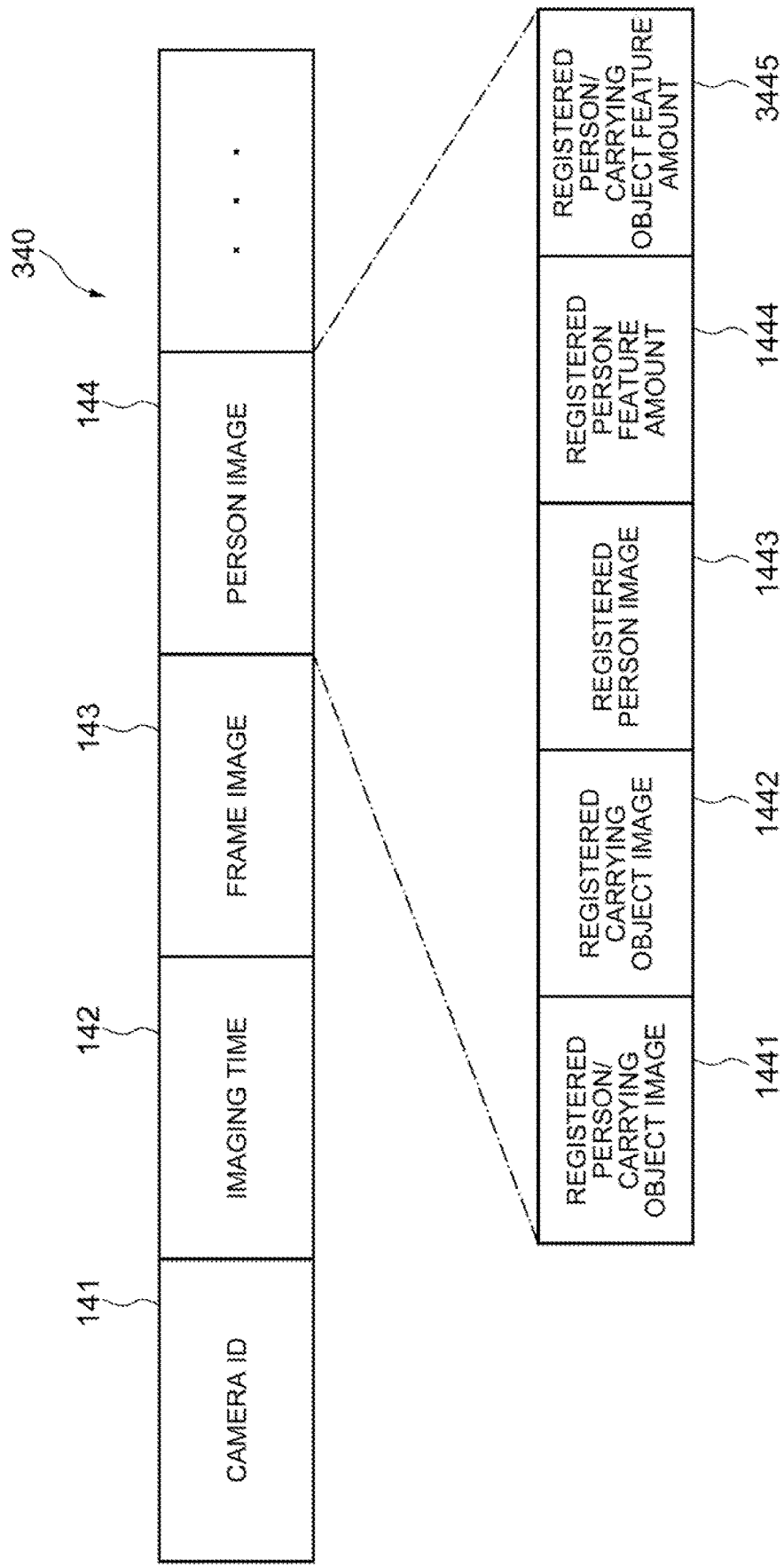
FIG. 15 illustrates an exemplary configuration of information stored in a database according to the third exemplary embodiment of the present invention.

FIG. 15 illustrates an exemplary configuration of information stored in the database 340. As compared with the database 140 of FIG. 2, the database 340 differs in that each piece of person information 144 further includes a registered person/carrying object feature amount 3445. The other points are the same.

As compared with the retrieval device 150 of FIG. 1, the retrieval device 350 differs in that it includes a carrying object feature amount extraction unit 357, an integration unit 358, and a determination unit 356. The other points are the same.

The carrying object feature amount extraction unit 357 extracts a feature amount of a carrying object from a query carrying object image extracted by the carrying object image extraction unit 153. As the type of a feature amounts to be extracted, any feature amount is acceptable if it is a feature amount of an object, and is determined previously. A carrying object feature amount extracted by the carrying object feature amount extraction unit 357 is also referred to as a query carrying object feature amount.

The integration unit 358 links a query person feature amount extracted by the person feature amount extraction unit 155 and a query carrying object feature amount extracted by the carrying object feature amount extraction unit 357 to thereby calculate a person/carrying object feature amount. In the case of extracting a feature amount from a person/carrying object image that is an image of a person including an image of a carrying object, the feature amount may be extracted from an image of a carrying object in an unbalanced manner or, in contrast, may be extracted from an image of the person in an unbalanced manner. When the feature amount is extracted from an image of a carrying object in an unbalanced manner, the feature amount of the person is reduced to that extent, so that the possibility of a failure in re-identification of the person increases. Meanwhile, in the person/carrying object feature amount obtained by detecting the person image and the carrying object image from the person/carrying object image and integrating the person feature amount and the carrying object feature amount extracted therefrom, it is possible to prevent the amount of the feature amount from being unbalanced to either the person or the carrying object. A person/carrying object feature amount extracted by the integration unit 358 is also referred to as a query person/carrying object feature amount.

First, through the processing similar to that performed by the determination unit 156, the determination unit 356 selects one or more retrieval results of the person in the registered person image having a high probability that the person is the same as the person in the query person image. Each retrieval result selected by the determination unit 356 includes, for example, the registered person/carrying object image 1441, the registered carrying object image 1442, the registered person image 1443, the registered person feature amount 1444, the registered person/carrying object feature amount 3445, the camera ID 141, the imaging time 142, and the frame image 143.

Then, the determination unit 356 determines which of the first retrieval processing and the fourth retrieval processing, the retrieval processing is. In the case of the first retrieval processing, the determination unit 356 displays one or more retrieval results on the display device 130, or/and outputs them to an external device not illustrated, and ends the retrieval processing.

In the case of the fourth retrieval processing, the determination unit 356 performs the processing described below.

First, the determination unit 356 compares, for each registered person/carrying object feature amount 3446 of a person stored in the database 340, the query person/carrying object feature amount with the registered person/carrying object feature amount 3446, and calculates a score indicating the degree that the person in the query person/carrying object image is the same as the person of the registered person/carrying object image 1441. The registered person/carrying object feature amount 3446 to be compared may be all registered person/carrying object feature amounts 3446 stored in the database 340. Alternatively, the registered person/carrying object feature amount 3446 to be compared may be the registered person/carrying object feature amount 3446 of a person extracted from frame images captured by one or more cameras 110 having specific camera IDs selected according to an instruction of the operator. Alternatively, the registered person/carrying object feature amount 3446 to be compared may be the registered person/carrying object feature amount 3446 of a person extracted from a frame image included in the period of time of the imaging time designated by the operator.

Moreover, the determination unit 356 selects a retrieval result on the basis of the calculated score. For example, the determination unit 356 sorts the scores of the registered person/carrying object feature amount 3446 in the descending order, and selects n pieces of retrieval results corresponding to the top n pieces of scores of the registered person/carrying object feature amounts 3446. Here, n represents a positive integer of 1 or larger, and may be a fixed value or a variable vale. Alternatively, the determination unit 356 selects one or a plurality of retrieval results corresponding to one or a plurality of registered person/carrying object feature amounts 3446 having scores exceeding a predetermined score threshold. The determination unit 356 allows information similar to that of the first retrieval result to be included in each retrieval result, for example. However, the information included in each retrieval result may be information other than that described above. Further, the determination unit 356 displays the selected one or a plurality of retrieval results on the display device 130, or/and outputs to an external device not illustrated.

As compared with the registration device 160 of FIG. 1, the registration device 360 differs in that it includes a carrying object feature amount extraction unit 367, an integration unit 368, and a storage control unit 366. The other parts are the same.

The carrying object feature amount extraction unit 367 extracts a feature amount of the carrying object from a registered carrying object image extracted by the carrying object image extraction unit 163, as similar to the carrying object feature amount extraction unit 357. As similar to the integration unit 358, the integration unit 368 integrates the registered person feature amount extracted by the person feature amount extraction unit 165 and the registered carrying object feature amount extracted by the carrying object feature amount extraction unit 367 to thereby calculate the registered person/carrying object feature amount 3445.

The storage control unit 366 stores, in the database 340, an entry configured of the frame image 143 acquired by the image acquisition unit 161, the person information 144 for each person detected by the person/carrying object image extraction unit 162, the camera ID 141 of the camera capturing the frame image, and the imaging time 142 of the frame image 143. The person information 144 of the entry includes the registered person/carrying object image 1441 extracted by the person/carrying object image extraction unit 162, the registered carrying object image 1442 extracted by the carrying object image extraction unit 163, the registered person image 1443 calculated by the person image calculation unit 164, the registered person feature amount 1444 extracted by the person feature amount extraction unit 165, and the registered person/carrying object feature amount 3445 calculated by the integration unit 368.

Each of the retrieval device 350 and the registration device 360 as described above can be realized by an information processing device configured of a computer 1000 and a storage medium 2000 as illustrated in FIG. 19 for example, as similar to the retrieval device 150 and the registration device 160.

Next, operation of the person retrieval system 300 will be described. Operation of the person retrieval system 300 is largely divided into a database update operation and a retrieval operation. The database update operation is performed by the registration device 360. The retrieval operation is performed by the retrieval device 350.

Figure 16:
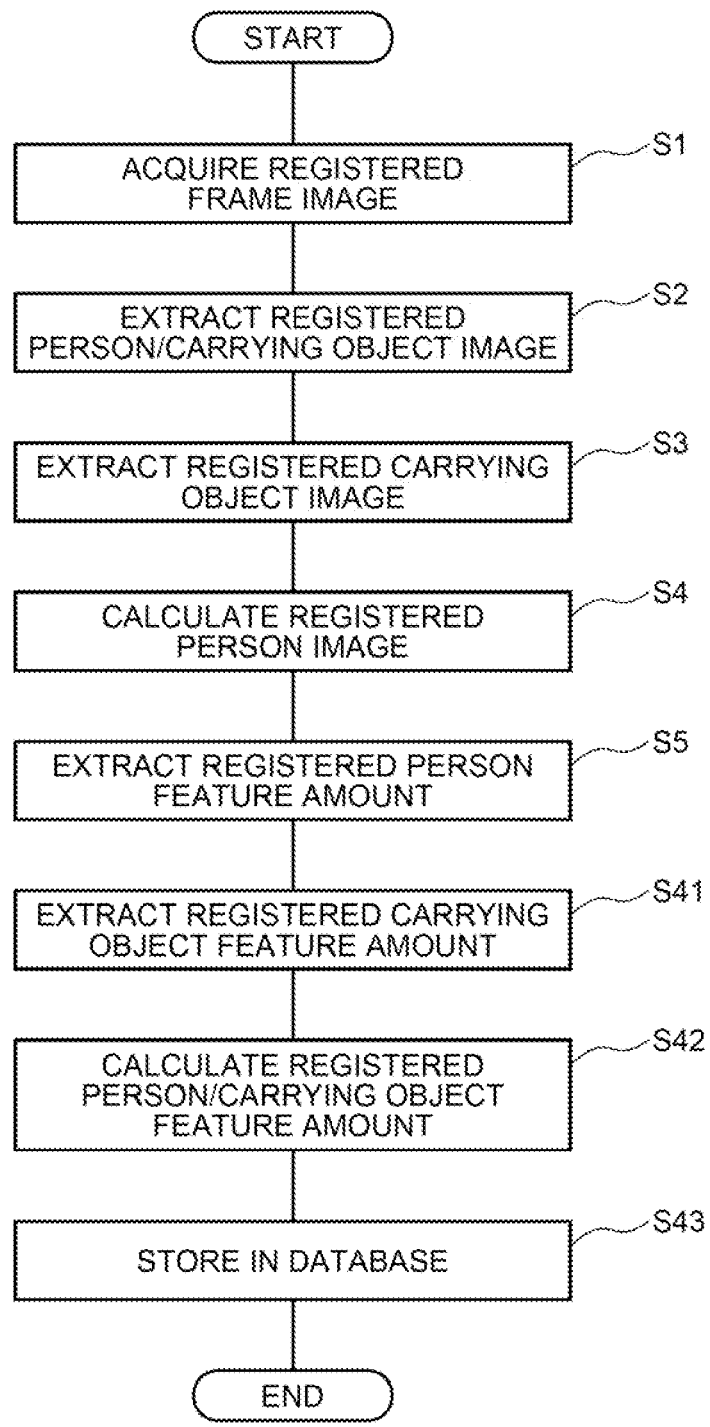
FIG. 16 is a flowchart illustrating an example of a database update operation of the person retrieval system according to the third exemplary embodiment of the present invention.

First, the database update operation will be described with reference to the flowchart of FIG. 16 illustrating an example of the processing. Upon initiation of the processing illustrated in FIG. 16, the registration device 360 first executes processing of steps S1 to S5 as similar to the registration device 160. Then, the carrying object feature amount extraction unit 367 of the registration device 360 extracts the feature amount of the carrying object from the registered carrying object image extracted by the carrying object image extraction unit 163 as a registered carrying object feature amount (step S41). Then, the integration unit 368 calculates the registered person/carrying object feature amount 3445 in which registered person feature amount extracted by the person feature amount extraction unit 165 and the carrying object feature amount extracted by the carrying object feature amount extraction unit 367 are integrated (step S42). Then, the storage control unit 366 stores, in the database 340, an entry configured of the frame image 143 acquired by the image acquisition unit 161, the person information 144 for each person detected from the frame image, the camera ID 141 of the camera capturing the frame image, and the imaging time 142 of the frame image 143 (step S43). The storage control unit 366 allows the person information 144 of the entry to include the registered person/carrying object image 1441 extracted by the person/carrying object image extraction unit 162, the registered carrying object image 1442 extracted by the carrying object image extraction unit 163, the registered person image 1443 calculated by the person image calculation unit 164, the registered person feature amount 1444 extracted by the person feature amount extraction unit 165, and the registered person/carrying object feature amount 3445 calculated by the integration unit 368.

Figure 17:
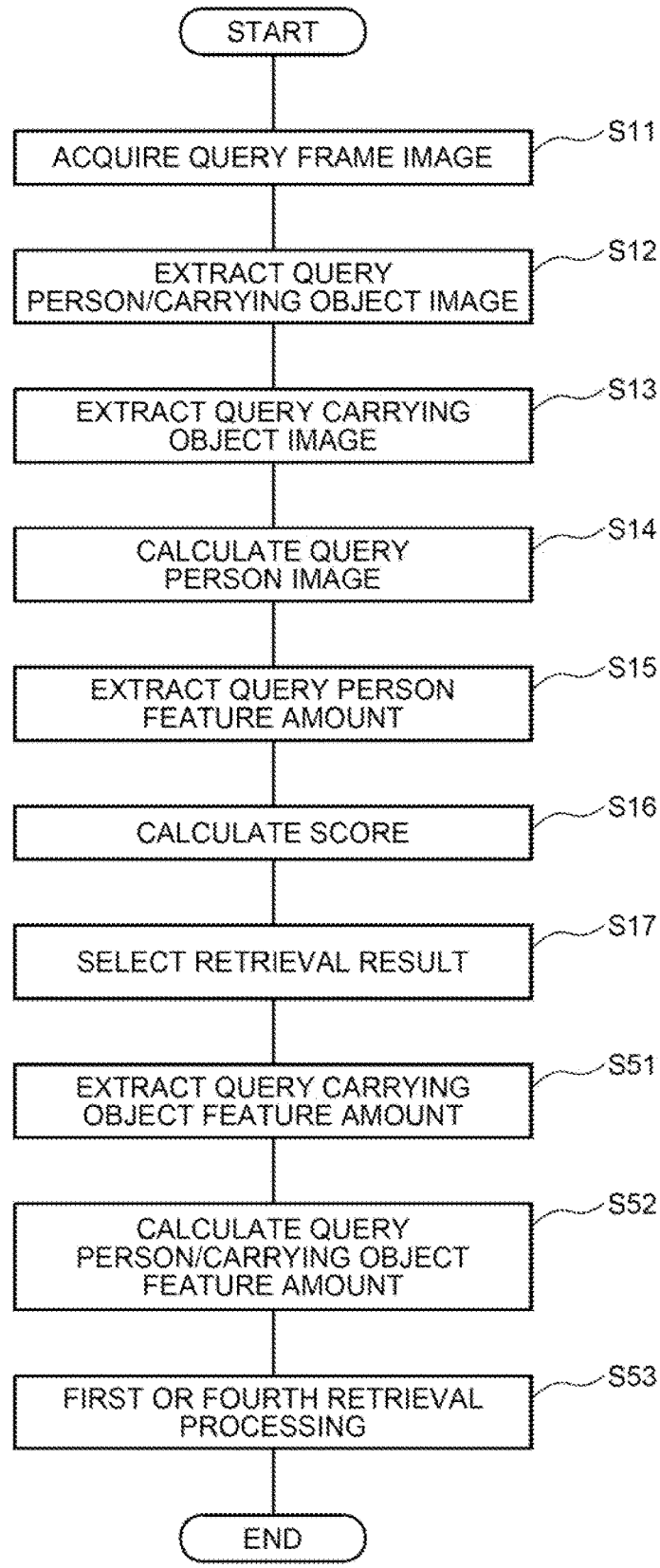
FIG. 17 is a flowchart illustrating an example of a retrieval operation of the person retrieval system according to the third exemplary embodiment of the present invention.

Next, the retrieval operation will be described with reference to the flowchart of FIG. 17 illustrating an example of the processing. Upon initiation of the processing illustrated in FIG. 17, the retrieval device 350 first executes processing of steps S11 to S17 as similar to the retrieval device 150.

Then, the carrying object feature amount extraction unit 357 of the retrieval device 350 extracts the feature amount of the carrying object from the query carrying object image extracted by the carrying object image extraction unit 153, as a query carrying object feature amount (step S51). The integration unit 358 calculates the query person/carrying object feature amount in which the person feature amount extracted by the person feature amount extraction unit 155 and the carrying object feature amount extracted by the carrying object feature amount extraction unit 357 are integrated (step S52). Then, the determination unit 356 of the retrieval device 350 executes either one of the first retrieval processing and the fourth retrieval processing (step S53). In the first retrieval processing, the determination unit 356 displays the retrieval result selected at step S17 on the display device 130, as a retrieval result of the person in the registered person image having a high probability that the person is the same as the person in the query person image, regardless of presence or absence of a carrying object and a difference in the carrying objects. In the fourth retrieval processing, the determination unit 356 generates a retrieval result based on the comparison between the query person/carrying object feature amount and the registered person/carrying object feature amount, and displays it on the display unit 130.

Next, an exemplary configuration of the determination unit 356 will be described.

Figure 18:
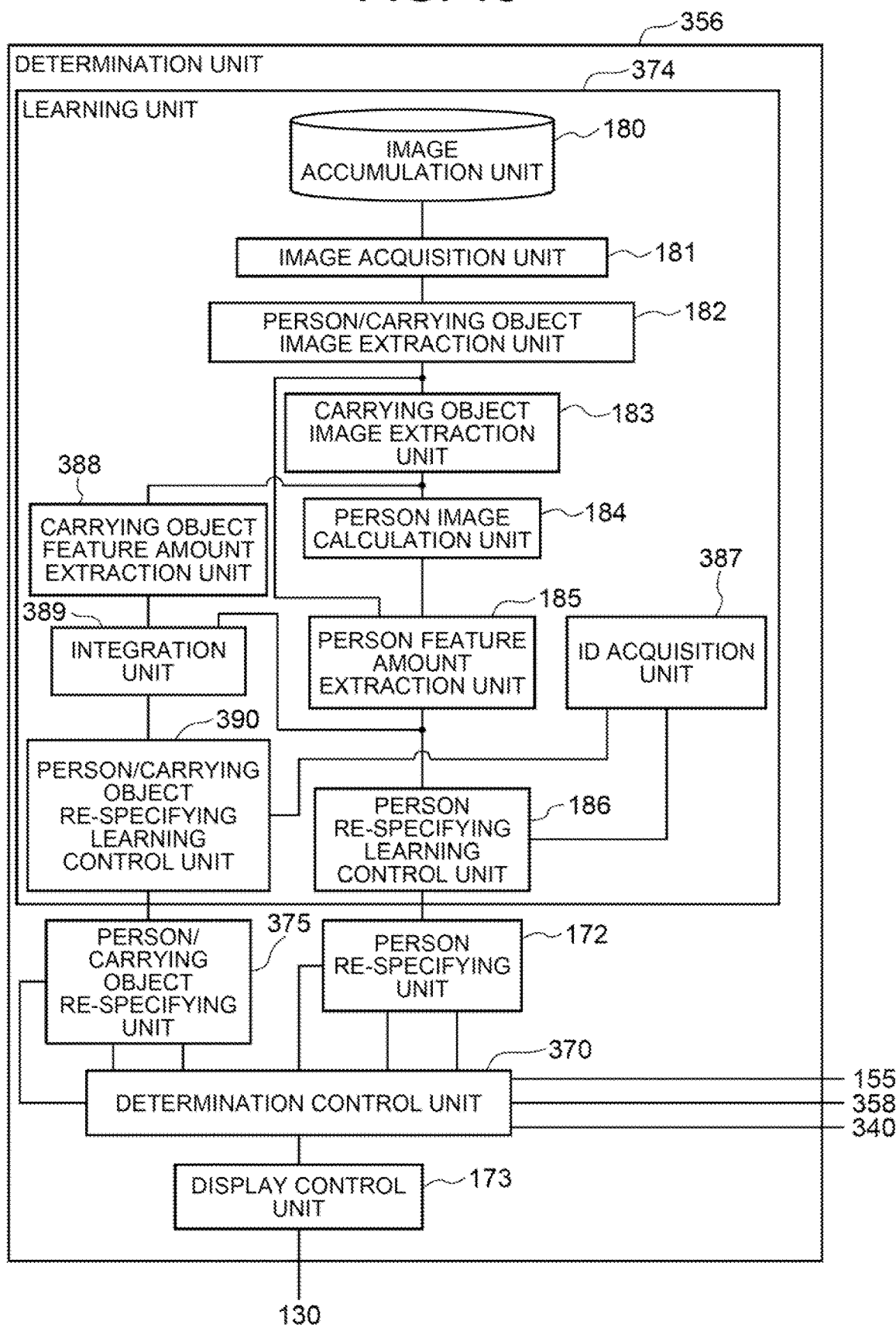
FIG. 18 is a block diagram illustrating an example of a determination unit according to the third exemplary embodiment of the present invention.

FIG. 18 is a block diagram illustrating an example of the determination unit 356. Referring to FIG. 18, the determination unit 356 is configured of a determination control unit 370, a person re-specifying unit 172, a display control unit 173, a learning unit 374, and a person/carrying object re-specifying unit 375. The determination control unit 370, the learning unit 374, and the person/carrying object re-specifying unit 375 are different from the configuration of the determination unit 156 of FIG. 8.

Then, the person/carrying object re-specifying unit 375 receives, as inputs, a query person/carrying object feature amount calculated by the integration unit 358 and a registered person/carrying object feature amount 3445 acquired from the database 340, and calculates a score indicating the degree that the person in the query person/carrying object image having the query person/carrying object feature amount and the person in the registered person/carrying object image 1441 having the registered person/carrying object feature amount 3445 are the same. The person/carrying object re-specifying unit 375 is configured to, for example, by inputting the query person/carrying object feature amount and the registered person/carrying object feature amount to a learning model having been learned by machine-learning for estimating whether a pair of person/carrying object feature amounts are the person/carrying object feature amounts of the same person, acquire an estimation probability of whether or not they are the person/carrying object feature amounts of the same person, from the learned model. The learning model can be generated in advance through machine learning using a machine learning algorism such as a neural network by using various pairs of person/carrying object feature amounts of the same person and various pairs of person/carrying object feature amounts of different persons as teacher data.

The learning unit 374 is a means for allowing the learning model of the person re-specifying unit 172 and the person/carrying object re-specifying unit 375 to be machine-learned. The learning unit 374 includes an image accumulation unit 180, an image acquisition unit 181, a person/carrying object image extraction unit 182, a carrying object image extraction unit 183, a person image calculation unit 184, a person feature amount extraction unit 185, a person re-specifying learning control unit 186, an ID acquisition unit 387, a carrying object feature amount extraction unit 388, an integration unit 389, and a person/carrying object re-specifying learning control unit 390. Among them, the ID acquisition unit 387, the carrying object feature amount extraction unit 388, the integration unit 389, and the person/carrying object re-specifying learning control unit 390 are different from the configuration of the learning unit 174 of FIG. 8, and the other parts are the same.

The carrying object feature amount extraction unit 388 extracts a feature amount of the carrying object from a carrying object image extracted by the carrying object image extraction unit 183, as similar to the carrying object feature amount extraction unit 357. The integration unit 389 calculates the person/carrying object feature amount in which the person feature amount extracted by the person feature amount extraction unit 185 and the carrying object feature amount extracted by the carrying object feature amount extraction unit 388 are integrated. With respect to an image of a person having the same person ID, the ID acquisition unit 387 outputs the same person ID to the person re-specifying learning control unit 186 and the person/carrying object re-specifying learning control unit 390. The person/carrying object re-specifying learning control unit 390 uses the person/carrying object feature amount calculated by the integration unit 389 and the person ID output by the ID acquisition unit 287 to control machine learning of the person/carrying object re-specifying unit 375. That is, the person/carrying object re-specifying learning control unit 390 previously generates a learning model of the person/carrying object re-specifying unit 375 through machine learning using a machine learning algorism such as a neural network by using various pairs of person/carrying object feature amounts of the same person and various pairs of person/carrying object feature amounts of different persons as teacher data.

First, through the person re-specifying processing using the person re-specifying unit 172 as similar to the determination control unit 170, the determination control unit 370 selects one or more retrieval results of the person in the registered person image having a high probability that the person is the same as the person in the query person image, and stores them in the retrieval result set. Then, the determination control unit 370 executes either one of the first retrieval processing and the fourth retrieval processing. In the first retrieval processing, the determination unit 356 displays the retrieval result stored in the retrieval result set on the display device 130 via the display control unit 173, as a retrieval result of the person in the registered person image having a high probability that the person is the same as the person in the query person image, regardless of presence or absence of a carrying object and a difference in the carrying object. In the fourth retrieval processing, the determination unit 356 generates a retrieval result based on the comparison between the query person/carrying object feature amount and the registered person/carrying object feature amount 3445, and displays it on the display unit 130.

The determination control unit 370 performs determination of whether or not the person is the same person between the query person/carrying object feature amount and the registered person/carrying object feature amount 3445 in the fourth retrieval processing by using the person/carrying object re-specifying unit 375. That is, the determination control unit 370 supplies the query person/carrying object feature amount calculated by the integration unit 358 to one input of the person/carrying object re-specifying unit 375, and supplies the registered person/carrying object feature amount 3445 extracted from the database 340 to the other input of the person/carrying object re-specifying unit 375. Then, the determination control unit 370 selects a result of the fourth retrieval processing on the basis of the score output from the person/carrying object re-specifying unit 375, and displays it on the display device 130.

Fourth Exemplary Embodiment

Figure 20:
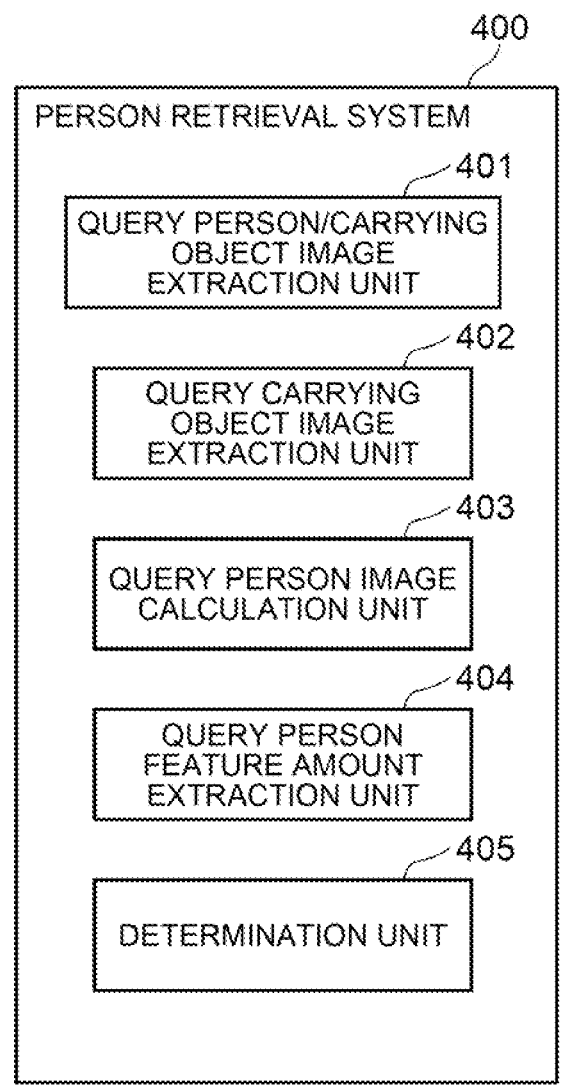
FIG. 20 is a block diagram of a person retrieval system according to a fourth exemplary embodiment of the present invention.

Next, a fourth exemplary embodiment of the present invention will be described with reference to FIG. 20. FIG. 20 is a block diagram of a person retrieval system 400 according to the present embodiment. In the present embodiment, the outline of the present invention will be described.

Referring to FIG. 20. the person retrieval system 400 includes a query person/carrying object image extraction unit 401, a query carrying object image extraction unit 402, a query person image calculation unit 403, a query person feature amount extraction unit 404, and a determination unit 405.

The query person/carrying object image extraction unit 401 is configured to extract a query person/carrying object image that is an image of a person to be retrieved including an image of a carrying object, from an input image. The query person/carrying object image extraction unit 401 may have the same configuration as that of the person/carrying object image extraction unit 152 of FIG. 1 for example, but is not limited thereto.

The query carrying object image extraction unit 402 is configured to extract an image of a carrying object from the query person/carrying object image. The query carrying object image extraction unit 402 may have the same configuration as that of the carrying object image extraction unit 153 of FIG. 1 for example, but is not limited thereto.

The query person image calculation unit 403 is configured to calculate a query person image that is a query person/carrying object image after processing is made on the image part of the carrying object in the query person/carrying object image so as to prevent a significant feature amount from being extracted. The query person image calculation unit 403 may have the same configuration as that of the person image calculation unit 154 of FIG. 1 for example, but is not limited thereto.

The query person feature amount extraction unit 404 is configured to extract a query person feature amount from the query person image. The query person feature amount extraction unit 404 may have the same configuration as that of the person feature amount extraction unit 155 of FIG. 1 for example, but is not limited thereto.

The determination unit 405 is configured to compare the query person feature amount with a registered person feature amount of a registered person having been registered in a database not illustrated, and determine whether or not the person to be retrieved is the same as the registered person. The determination unit 405 may have the same configuration as that of the determination unit 156 of FIG. 1 for example, but is not limited thereto.

The person retrieval system 400 configured as described above operates as described below. First, the query person/carrying object image extraction unit 401 extracts a query person/carrying object image that is an image of a person to be retrieved including an image of a carrying object, from an input image. Then, the query carrying object image extraction unit 402 extracts an image of a carrying object from the query person/carrying object image. Then, the query person image calculation unit 403 calculates a query person image that is a query person/carrying object image after processing is made on the image part of the carrying object in the query person/carrying object image so as to prevent a significant feature amount from being extracted. Then, the query person feature amount extraction unit 404 extracts a query person feature amount from the query person image. Then, the determination unit 405 compares the query person feature amount with a registered person feature amount of a registered person having been registered in a database not illustrated, and determines whether or not the person to be retrieved is the same as the registered person.

According to the person retrieval system 400 that is configured and operates as described above, it is possible to prevent a failure in retrieval of the same person due to an influence of a carrying object. This is because, the person retrieval system 400 extracts a query person feature amount from a query person/carrying object image after processing is performed on the image part of a carrying object in the query person/carrying object image that is an image of the person to be retrieved including an image of a carrying object so as to prevent a significant feature amount from being extracted, compares the extracted query person feature amount with the registered person feature amount of the registered person, and determines whether or not the person to be detected is the same as the registered person.

While the present invention has been described with reference to the exemplary embodiments described above, the present invention is not limited to the above-described embodiments. The form and details of the present invention can be changed within the scope of the present invention in various manners that can be understood by those skilled in the art. For example, the present invention also include an embodiment that is a combination of the second exemplary embodiment and the third exemplary embodiment and is configured to execute one retrieval processing selected from the first retrieval processing to the fourth retrieval processing according to the retrieval conditions and previous settings. Moreover, the present invention also includes an embodiment configured to execute only the first retrieval processing fixedly, an embodiment configured to execute only the second retrieval processing fixedly, an embodiment configured to execute only the third retrieval processing fixedly, and an embodiment configured to execute only the fourth retrieval processing fixedly.

INDUSTRIAL APPLICABILITY

The present invention is applicable to, for example, the case of retrieving an image of the same person from videos of monitoring cameras or the like.

The whole or part of the exemplary embodiments disclosed above can be described as, but not limited to, the following supplementary notes.

Supplementary Note 1

A person retrieval system comprising:
a query person and carrying object image extraction unit that extracts, from an input image, a query person and carrying object image that is an image of a person to be retrieved including an image of a carrying object;
a query carrying object image extraction unit that extracts an image of the carrying object from the query person and carrying object image;
a query person image calculation unit that calculates a query person image that is the query person and carrying object image after processing is made on an image part of the carrying object in the query person and carrying object image so as to prevent a significant feature amount from being extracted;
a query person feature amount extraction unit that extracts a query person feature amount from the query person image; and
a determination unit that compares the query person feature amount with a registered person feature amount of a registered person previously registered in a database, and determines whether or not the person to be retrieved is same as the registered person.

Supplementary Note 2

The person retrieval system according to supplementary note 1, further comprising
a query carrying object feature amount extraction unit that extracts a query carrying object feature amount from an image of the carrying object, wherein
the determination unit is configured to compare a registered carrying object feature amount with the query carrying object feature amount, the registered carrying object feature amount being previously registered in the database in association with the registered person determined to be the same as the person to be retrieved, and determine whether or not the registered person has a carrying object that is same as a carrying object held by the person to be retrieved.

Supplementary Note 3

The person retrieval system according to supplementary note 1 or 2, further comprising
a query carrying object feature amount extraction unit that extracts a query carrying object feature amount from the image of the carrying object, and
an integration unit that calculates a query person and carrying object feature amount in which the query person feature amount and the query carrying object feature amount are integrated, wherein
the determination unit is configured to further compare the query person and carrying object feature amount with a registered person and carrying object feature amount of the registered person previously registered in the database, and determine whether or not the person to be retrieved is same as the registered person.

Supplementary Note 4

The person retrieval system according to any of supplementary notes 1 to 3, wherein the determination unit includes:
a person re-specifying unit that performs the determination on a basis of the query person feature amount and the registered person feature amount; and
a learning unit that allows the person re-specifying unit to perform machine learning, and
the learning unit includes:
a learning person and carrying object image extraction unit that extracts, from a learning image, a learning person and carrying object image that is an image of a person including an image of a carrying object;
a learning carrying object image extraction unit that extracts an image of the carrying object from the learning person and carrying object image;
a learning person image calculation unit that calculates a learning person image that is the learning person and carrying object image after processing is made on an image part of the carrying object in the learning person and carrying object image so as to prevent a significant feature amount from being extracted; and
a learning person feature amount extraction unit that extracts a learning person feature amount to be used for the machine learning, from the learning person image.

Supplementary Note 5

The person retrieval system according to any of supplementary notes 1 to 4, wherein
the processing includes at least one of processing to replace a pixel value of an image part of the carrying object with a value 0, processing to set a weight of the pixel value of the image part of the carrying object to a minimum value, processing to replace the pixel value of the image part of the carrying object with a random value, and processing to replace the image part of the carrying object with a noise image.

Supplementary Note 6

A person retrieval method comprising:
extracting, from an input image, a query person and carrying object image that is an image of a person to be retrieved including an image of a carrying object;
extracting an image of the carrying object from the query person and carrying object image;
calculating a query person image that is the query person and carrying object image after processing is made on an image part of the carrying object in the query person and carrying object image so as to prevent a significant feature amount from being extracted;
extracting a query person feature amount from the query person image; and
comparing the query person feature amount with a registered person feature amount of a registered person previously registered in a database, and determining whether or not the person to be retrieved is same as the registered person.

Supplementary Note 7

The person retrieval method according to supplementary note 6, further comprising
extracting a query carrying object feature amount from an image of the carrying object, wherein
the determining includes comparing a registered carrying object feature amount with the query carrying object feature amount, the registered carrying object feature amount being previously registered in the database in association with the registered person determined to be the same as the person to be retrieved, and determining whether or not the registered person has a carrying object that is same as a carrying object held by the person to be retrieved.

Supplementary Note 8

The person retrieval method according to supplementary note 6 or 7, further comprising
extracting a query carrying object feature amount from the image of the carrying object, and
calculating a query person and carrying object feature amount in which the query person feature amount and the query carrying object feature amount are integrated, wherein
the determining include further comparing the query person and carrying object feature amount with a registered person and carrying object feature amount of the registered person previously registered in the database, and determining whether or not the person to be retrieved is same as the registered person.

Supplementary Note 9

The person retrieval method according to any of supplementary notes 6 to 8, wherein
the determining includes. before performing the determination by using a person re-specifying unit, allowing the person re-specifying unit to perform machine-learning, and
the machine-learning includes:
extracting, from a learning image, a learning person and carrying object image that is an image of a person including an image of a carrying object;
extracting an image of the carrying object from the learning person and carrying object image;
calculating a learning person image that is the learning person and carrying object image after processing is made on an image part of the carrying object in the learning person and carrying object image so as to prevent a significant feature amount from being extracted; and
extracting a learning person feature amount to be used for the machine learning, from the learning person image.

Supplementary Note 10

The person retrieval method according to any of supplementary notes 6 to 9, wherein
the processing includes at least one of processing to replace a pixel value of an image part of the carrying object with a value 0, processing to set a weight of the pixel value of the image part of the carrying object to a minimum value, processing to replace the pixel value of the image part of the carrying object with a random value, and processing to replace the image part of the carrying object with a noise image.

Supplementary Note 11

A computer-readable medium storing thereon a program for causing a computer to execute processing to:
extract, from an input image, a query person and carrying object image that is an image of a person to be retrieved including an image of a carrying object;

extract an image of the carrying object from the query person and carrying object image;
calculate a query person image that is the query person and carrying object image after processing is made on an image part of the carrying object in the query person and carrying object image so as to prevent a significant feature amount from being extracted;
extract a query person feature amount from the query person image; and
compare the query person feature amount with a registered person feature amount of a registered person previously registered in a database, and determine whether or not the person to be retrieved is same as the registered person.

REFERENCE SIGNS LIST 110 camera
120 image server
130 display device
140 database
150 retrieval device
160 registration device

What is claimed is:

1. A person retrieval device for improving person search accuracy based on input images from a plurality of cameras, comprising:
a memory containing program instructions; and
a processor coupled to the memory, wherein the processor is configured to execute the program instructions to:
extract, from an input image, a query person and carrying object image, as a query person-item image, that is an image including the entire body of a person to be retrieved including an image of a carrying object;
extract an image of the carrying object from the query person and carrying object image from the query person-item image, the image of the carrying object being one of a backpack or a rucksack;
calculate a query person image which is the query person-item image after applying processing to a portion, of an image of a query item in the query person-item image so that significant features are not extracted from the image of the query item, by replacing pixel values of the portion with zero;
extract a query person feature amount including a feature amount of the entire body from the query person image; and
compare the query person feature amount with a registered person feature amount of a registered person previously registered in a database based on a pre-trained machine learning model, and determine whether or not the person to be retrieved is same as the registered person.

2. The person retrieval device according to claim 1, wherein the processor is further configured to execute the instructions to
extract a query carrying object feature amount from the image of the carrying object, and
the determining includes comparing a registered carrying object feature amount with the query carrying object feature amount, the registered carrying object feature amount being previously registered in the database in association with the registered person determined to be the same as the person to be retrieved, and determining whether or not the registered person has a carrying object that is same as a carrying object held by the person to be retrieved.

3. The person retrieval device according to claim 1, wherein the processor is further configured to execute the instructions to:
extract a query carrying object feature amount from the image of the carrying object; and
calculate a query person and carrying object feature amount in which the query person feature amount and the query carrying object feature amount are integrated, and
the determining includes further comparing the query person and carrying object feature amount with a registered person and carrying object feature amount of the registered person previously registered in the database, and determining whether or not the person to be retrieved is same as the registered person.

4. The person retrieval device according to claim 1 for improving person search accuracy based on input images from a plurality of cameras, wherein
the determining includes inputting the query person feature amount and the registered person feature amount into a learning model having been learned by machine-learning for estimating whether or not a pair of person feature amounts are person feature amounts of a same person, and acquiring an estimation probability of whether or not the query person feature amount and the registered person feature amount are feature amounts of a same person, and
the machine-learning includes:
extracting, from a learning image, a learning person and carrying object image that is an image including the entire body of a person including an image of a carrying object;
extracting an image of the carrying object from the learning person and carrying object image from the query person-item image, the image of the carrying object being one of a backpack or rucksack;
calculating a learning person image, which is the query person-item image after applying processing to a portion of the image of the query item in the query person-item image so that significant features are not extracted from the image of the item, by replacing pixel values of the portion with zero; and
extracting a learning person feature amount including a feature amount of the entire body to be used for the machine learning, from the learning person image.

5. The person retrieval device according to claim 1, wherein
the processing includes at least one of processing to replace a pixel value of an image part of the carrying object with a value 0, processing to set a weight of the pixel value of the image part of the carrying object to a minimum value, processing to replace the pixel value of the image part of the carrying object with a random value, and processing to replace the image part of the carrying object with a noise image.

6. A person retrieval method for improving person search accuracy based on input images from a plurality of cameras, comprising:
extracting, from an input image, a query person and carrying object image, as a query person-item image, that is an image including the entire body of a person to be retrieved including an image of a carrying object;
extracting an image of the carrying object from the query person and carrying object image from the query person-item image, the image of the carrying object being one of a backpack or rucksack;

calculating a query person image, which is the query person-item image after applying processing to a portion, of the image of the query item in the query person-item image so that significant features are not extracted from the image of the item, by replacing pixel values of the portion with zero;

extracting a query person feature amount including a feature amount of the entire body from the query person image; and comparing the query person feature amount with a registered person feature amount of a registered person previously registered in a database based on a pretrained machine learning model, and determining whether or not the person to be retrieved is same as the registered person.

7. The person retrieval method according to claim 6, further comprising extracting a query carrying object feature amount from the image of the carrying object, wherein the determining includes comparing a registered carrying object feature amount with the query carrying object feature amount, the registered carrying object feature amount being previously registered in the database in association with the registered person determined to be the same as the person to be retrieved, and determining whether or not the registered person has a carrying object that is same as a carrying object held by the person to be retrieved.

8. The person retrieval method according to claim 6, further comprising:

extracting a query carrying object feature amount from the image of the carrying object; and calculating a query person and carrying object feature amount in which the query person feature amount and the query carrying object feature amount are integrated, wherein the determining include further comparing the query person and carrying object feature amount with a registered person and carrying object feature amount of the registered person previously registered in the database, and determining whether or not the person to be retrieved is same as the registered person.

9. The person retrieval method according to claim 6, wherein the determining includes inputting the query person feature amount and the registered person feature amount into a learning model having been learned by machine-learning for estimating whether or not a pair of person feature amounts are person feature amounts of a same person, and acquiring an estimation probability of whether or not the query person feature amount and the registered person feature amount are feature amounts of a same person, and the machine-learning includes:

extracting, from a learning image, a learning person and carrying object image that is an image including the entire body of a person including an image of a carrying object;

extracting an image of the carrying object from the learning person and carrying object image;

calculating a learning person image that is the learning person and carrying object image after processing is made on an image part of the carrying object in the learning person and carrying object image so as to prevent a significant feature amount from being extracted; and extracting a learning person feature amount including a feature amount of the entire body to be used for the machine learning, from the learning person image.

10. The person retrieval method according to claim 6, wherein the processing includes at least one of processing to replace a pixel value of an image part of the carrying object with a value 0, processing to set a weight of the pixel value of the image part of the carrying object to a minimum value, processing to replace the pixel value of the image part of the carrying object with a random value, and processing to replace the image part of the carrying object with a noise image.

11. A non-transitory computer-readable medium storing thereon a program comprising instructions for causing a computer to execute processing to:

extract, from an input image, a query person and carrying object image, as a query person-item image, that is an image including the entire body of a person to be retrieved including an image of a carrying object;

extract an image of the carrying object from the query person and carrying object image from the query person-item image, the image of the carrying object being one of a backpack or rucksack;

calculate a query person image, which is the query person-item image after applying processing to a portion, of the image of the query item in the query person-item image so that significant features are not extracted from the image of the item, by replacing pixel values of the portion with zero;

extract a query person feature amount including a feature amount of the entire body from the query person image; and compare the query person feature amount with a registered person feature amount of a registered person previously registered in a database based on a pretrained machine learning model, and determine whether or not the person to be retrieved is same as the registered person.

12. The person retrieval device according to claim 1, wherein the carrying object is the backpack, wherein the query person and carrying object image includes the entire body of the person, the backpack, and clothes worn by the person, the backpack being worn over at least part of the clothes, wherein the image of the carrying object includes the backpack and excludes at least part of the entire body of the person and the clothes worn by the person, and wherein the query person image comprises the entire body of the person and the clothes worn by the person.

* * * * *